US010963593B1

(12) United States Patent
Campagna et al.

(10) Patent No.: US 10,963,593 B1
(45) Date of Patent: Mar. 30, 2021

(54) SECURE DATA STORAGE USING MULTIPLE FACTORS

(71) Applicant: Amazon Technologies, Inc., Seattle, WA (US)

(72) Inventors: Matthew John Campagna, Bainbridge Island, WA (US); Shay Gueron, Haifa (IL)

(73) Assignee: Amazon Technologies, Inc., Seattle, WA (US)

( * ) Notice: Subject to any disclaimer, the term of this patent is extended or adjusted under 35 U.S.C. 154(b) by 271 days.

(21) Appl. No.: 16/216,814

(22) Filed: Dec. 11, 2018

(51) Int. Cl.
*G06F 21/78* (2013.01)
*H04L 9/08* (2006.01)
*G06F 21/60* (2013.01)
*H04L 29/06* (2006.01)
*H04L 9/14* (2006.01)

(52) U.S. Cl.
CPC ........... *G06F 21/78* (2013.01); *G06F 21/602* (2013.01); *H04L 9/083* (2013.01); *H04L 9/0861* (2013.01); *H04L 9/14* (2013.01); *H04L 63/0428* (2013.01)

(58) Field of Classification Search
None
See application file for complete search history.

(56) References Cited

U.S. PATENT DOCUMENTS 9,832,171 B1 * 11/2017 Roth ..................... H04L 9/3213
2017/0093805 A1 * 3/2017 Proulx ................ H04L 63/0876

OTHER PUBLICATIONS

Blake-Wilson et al., "Elliptic Curve Cryptography (ECC) Cipher Suites for Transport Layer Security (TLS)," Request for Comments: 4492, Informational, May 2006, 36 pages.
Blake-Wilson et al., "Transport Layer Security (TLS) Extensions," Request for Comments: 3546, Standards Track, Jun. 2003, 28 pages.
Blake-Wilson et al., "Transport Layer Security (TLS) Extensions," Request for Comments: 4366, Standards Track, Apr. 2006, 29 pages.
Blumenthal et al., "Pre-Shared Key (PSK) Ciphersuites with NULL Encryption for Transport Layer Security (TLS)," Request for Comments: 4785, Standards Track, Jan. 2007, 6 pages.
Brown et al., "Transport Layer Security (TLS) Authorization Extensions," Request for Comments: 5878, Experimental, May 2010, 19 pages.
Chown, "Advanced Encryption Standard (AES) Ciphersuites for Transport Layer Security (TLS)," Request for Comments: 3268, Standards Track, Jun. 2002, 8 pages.
Dierks et al., "The TLS Protocol Version 1.0," Request for Comments: 2246, Standards Track, Jan. 1999, 75 pages.

(Continued)

*Primary Examiner* — Benjamin E Lanier
(74) *Attorney, Agent, or Firm* — Davis Wright Tremaine LLP

(57) ABSTRACT

Techniques described herein enhance information security in contexts that utilize key management systems and other providers of cryptographic services. A user of a key, management system is able to use a secret that is outside the control of the key management system combined with a secret that is cryptographically protected by the key management system (e.g., by encryption using a key managed by the key management system) to generate a message encryption key, thereby rendering the secrets individually insufficient for access to data encrypted using the message encryption key.

24 Claims, 9 Drawing Sheets

(56) References Cited

OTHER PUBLICATIONS

Dierks et al., "The Transport Layer Security (TLS) Protocol Version 1.2," Request for Comments: 5246, Standards Track, Aug. 2008, 98 pages.
Eastlake, "Transport Layer Security (TLS) Extensions: Extension Definitions," Request for Comments: 6066, Standards Track, Jan. 2011, 25 pages.
Eronen et al., "Pre-Shared Key Ciphersuites for Transport Layer Security (TLS)," Request for Comments: 4279, Standards Track, Dec. 2005, 16 pages.
Ford-Hutchinson, "Securing FTP with TLS," Request for Comments: 4217, Standards Track, Oct. 2005, 29 pages.
Friend, "Transport Layer Security (TLS) Protocol Compression Using Lempel-Ziv-Stac (LZS)," Request for Comments: 3943, Informational, Nov. 2004, 13 pages.
Gutmann, "Encrypt-then-MAC for Transport Layer Security (TLS) and Datagram Transport Layer Security (DTLS)," Request for Comments: 7366, Standards Track, Sep. 2014, 7 pages.
Hoffman, "SMTP Service Extension for Secure SMTP over Transport Layer Security," Request for Comments: 3207, Standards Track, Feb. 2002, 9 pages.
Hollenbeck, "Transport Layer Security Protocol Compression Methods," Request for Comments: 3749, Standards Track, May 2004, 8 pages.
Kanno et al., "Addition of the Camellia Cipher Suites to Transport Layer Security (TLS)," Request for Comments: 6367, Informational, Sep. 2011, 9 pages.
Kato et al., "Camellia Cipher Suites for TLS," Request for Comments: 5932, Standards Track, Jun. 2010, 7 pages.
Khare et al., "Upgrading to TLS Within HTTP/1.1," Request for Comments: 2817, Standards Track, May 2000, 13 pages.
Kim et al., "Addition of the ARIA Cipher Suites to Transport Layer Security (TLS)," Request for Comments: 6209, Informational, Apr. 2011, 10 pages.
Krawczyk et al., "HMAC-based Extract-and Expand Key Derivation Function (HKDF)," Request for Comments: 5869, Informational, May 2010, 14 pages.
Lee et al., "Addition of SEED Cipher Suites to Transport Layer Security (TLS)," Request for Comments: 4162, Standards Track, Aug. 2005, 6 pages.
Mavrogiannopoulos et al., "Using OpenPGP Keys for Transport Layer Security (TLS) Authentication," Request for Comments: 6091, Informational, Feb. 2011, 9 pages.
Mavrogiannopoulos, "Using OpenPGP Keys for Transport Layer Security (TLS) Authentication," Request for Comments: 5081, Experimental, Nov. 2007, 9 pages.
McGrew et al., "AES-CCM Cipher Suites for Transport Layer Security (TLS)," Request for Comments: 6655, Standards Track, Jul. 2012, 8 pages.
McGrew et al., "Datagram Transport Layer Security (DTLS) Extension to Establish Keys for the Secure Real-time Transport Protocol (SRTP)," Request for Comments: 5764, Standards Track, May 2010, 27 pages.
Medvinsky et al., "Addition of Kerberos Cipher Suites to Transport Layer Security (TLS)," Request for Comments: 2712, Standards Track, Oct. 1999, 7 pages.
Merkle et al., "Elliptic Curve Cryptography (ECC) Brainpool Curves for Transport Layer Security (TLS)," Request for Comments: 7027, Informational, Oct. 2013, 11 pages.
Moriai et al., "Addition of Camellia Cipher Suites to Transport Layer Security (TLS)," Request for Comments: 4132, Standards Track, Jul. 2005, 8 pages.
Newman, "Using TLS with IMAP, POP3 and ACAP," Request for Comments: 2595, Standards Track, Jun. 1999, 16 pages.
Phelan, "Datagram Transport Layer Security (DTLS) over the Datagram Congestion Control Protocol (DCCP)," Request for Comments: 5238, Standards Track, May 2008, 11 pages.
Rescorla et al., "Datagram Transport Layer Security Version 1.2," Request for Comments: 6347, Standards Track, Jan. 2012, 33 pages.
Rescorla et al., "Datagram Transport Layer Security," Request for Comments: 4347, Standards Track, Apr. 2006, 26 pages.
Rescorla et al., "Transport Layer Security (TLS) Renegotiation Indication Extension," Request for Comments: 5746, Standards Track, Feb. 2010, 16 pages.
Rescorla, "HTTP Over TLS," Request for Comments: 2818, Informational, May 2000, 8 pages.
Rescorla, "TLS Elliptic Curve Cipher Suites with SHA-256/384 and AES Galois Counter Mode (GCM)," Request for Comments: 5289, Informational, Aug. 2008, 7 pages.
Salowey et al., "AES Galois Counter Mode (GCM) Cipher Suites for TLS," Request for Comments: 5288, Standards Track, Aug. 2008, 9 pages.
Salowey et al., "Transport Layer Security (TLS) Session Resumption without Server-Side State," Request for Comments: 5077, Standards Track, Jan. 2008, 21 pages.
Salter et al., "Suite B Profile for Transport Layer Security (TLS)," Request for Comments: 6460, Informational, Jan. 2012, 15 pages.
Santesson et al., "TLS User Mapping Extension," Request for Comments: 4681, Standards Track, Oct. 2006, 11 pages.
Santesson, "TLS Handshake Message for Supplemental Data," Request for Comments: 4680, Standards Track, Sep. 2006, 10 pages.
Taylor et al., "Using the Secure Remote Password (SRP) Protocol for TLS Authentication," Request for Comments: 5054, Informational, Nov. 2007, 25 pages.
Tuexen et al., "Datagram Transport Layer Security (DTLS) for Stream Control Transmission Protocol (SCTP)," Request for Comments: 6083, Standards Track, Jan. 2011, 10 pages.
Turner et al., "Prohibiting Secure Sockets Layer (SSL) Version 2.0," Request for Comments: 6176, Standards Track, Mar. 2011, 4 pages.

* cited by examiner

SECURE DATA STORAGE USING MULTIPLE FACTORS

BACKGROUND

In various contexts, managing the security of computing resources, as well as the security of stored data, is of utmost importance in many organizations. Organizations, for example, often comprise networks of computing devices that communicate to provide a set of services. These networks often connect with other networks, and often span multiple geographic regions. The operations of the organization may depend on networks of computing devices from other organizations to reduce infrastructure costs and achieve various other advantages. As the size and complexities of such organizations grow, ensuring proper authentication and secure access to the resources and data they contain can be increasingly difficult.

The reliance of many organizations on the computing resources of other organizations (e.g., using cloud computing services) may result in the transfer and storage of data being controlled by third parties, outside of the organization in which the data may have originated. This may entail a lack of trust; justified or not; that may stem from concerns of the safety and integrity of the data managed by third parties. Additionally, an organization may desire to enhance the security of their own data, so access to data by rogue employees or unauthorized others can be controlled and contained. The secure movement of an organization's data along various entities is generally complicated, complex, and requires significant amounts of resources to ensure proper authentication.

BRIEF DESCRIPTION OF THE DRAWINGS

Various techniques will be described with reference to the drawings, in which.

DETAILED DESCRIPTION

Figure 1:
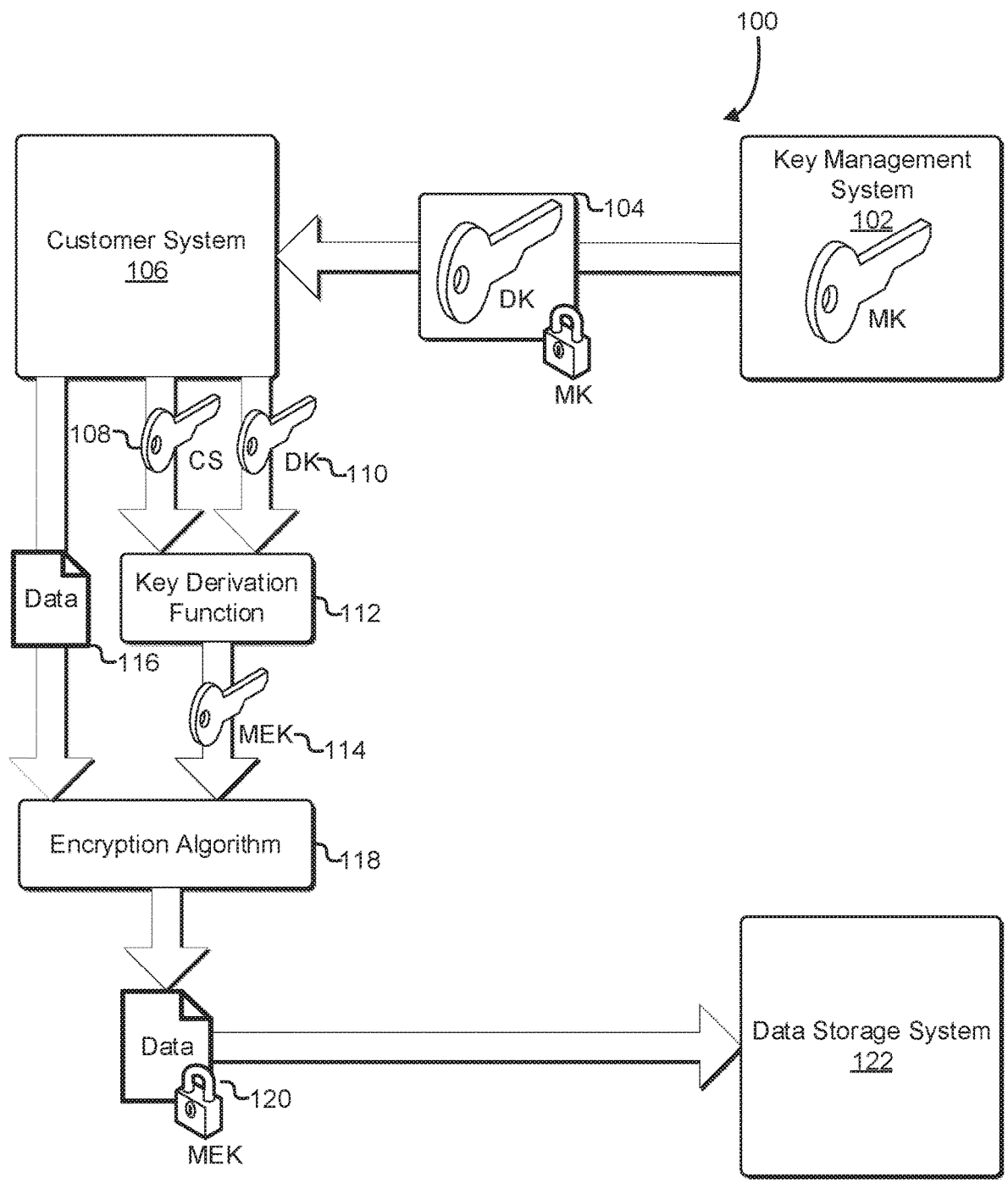
FIG. 1 shows an illustrative example of a customer system storing data securely by using multi-factor encryption.

Techniques described and suggested herein relate to the security of data in a manner that ensures no single entity is able to access the data without the appropriate authentication and/or authorization. Processes for securing data generally involve the encryption of the data and the use of cryptographic keys, also referred to more generally as "keys." The cryptographic keys may be generated or derived through one or more cryptographic operations, and the cryptographic operations may require components from multiple entities. The components that are used may be accessible to one involved entity but not another, and all components may be required to construct the one or more cryptographic keys to decrypt the data. Thus, if a component is compromised (e.g., if an unauthorized entity gains access to a component), the component alone cannot be used in the processes to decrypt the data without access to one or more additional components which may be stored by other entities.

In various embodiments, a customer of a computing resource provider has access to a component, such as a customer held cryptographic key, passphrase, or other supplemental secret to which the computing resource provider lacks access. Similarly, the computing resource service provider has access to a managed key to which the customer lacks access. The customer may submit requests to the computing resource service provider to cause the computing resource provider to perform cryptographic operations using the managed key. The requests may specify the managed key by an identifier associated with the managed key; responses to the requests may include other keys or components, which may be encrypted/decrypted using the managed key. The managed key may be managed exclusively for the customer, while ensuring that the customer, as well as other entities, do not have access to the managed key.

The customer may also submit requests to the computing resource service provider to use the managed key, as described earlier, to encrypt and send a cryptographic data key. The computing resource service provider may then respond with a cryptographic data key, as well as an encrypted version of the cryptographic data key. The customer can use the cryptographic data key, along with a customer held cryptographic key, passphrase, or other supplemental secret, to generate another cryptographic key, specifically for message encryption. This message encryption cryptographic key may then be used to encrypt data that the customer desires to encrypt. Upon encrypting the data, the customer may perform various operations in connection with the encrypted data, such as storing the encrypted data in a data storage device or system. In some embodiments, data is encrypted so that components from a customer as well as components from a computing resource provider are needed construct the keys to decrypt and access the data. Additionally, multiple computing resource service providers (or, generally, multiple third party entities), may be utilized in an encryption process so that a component exclusively held by each third party is necessary for the decryption of the data.

In the preceding and following description, various techniques are described. For purposes of explanation, specific configurations and details are set forth in order to provide a thorough understanding of possible ways of implementing the techniques. However, it will also be apparent that the techniques described below may be practiced in different configurations without the specific details. Furthermore, well-known features may be omitted or simplified to avoid obscuring the techniques being described.

FIG. 1 illustrates an environment 100 in which various embodiments can be implemented. In the environment 100, the key management system 102 may provide a variety of services. The key management system 102 may include a network of one or more local devices, such as a hardware security module (HSM), a trusted platform module (TPM), a cryptographic processor, and/or variations thereof. Additionally or alternatively, the key management system 102 may include one or more instances of a physical computing instance, such as a physical server computer, or one or more instances of a virtual computing instance, such as a virtual machine, which may be hosted on one or more computer servers. Other variations are also considered as being within the scope of the present disclosure.

The key management system 102 may operate a cryptography service; generally, a cryptography service may be a collection of computing resources collectively configured to manage and use cryptographic keys for customers of the key management system 102, Keys used by the key management system 102 may have associated identifiers that the customers can reference when submitting requests to perform cryptographic operations (such as encryption, decryption, and message signing) and/or other operations, such as key rotation. The key, management system 102 may securely maintain the cryptographic keys to avoid access by unauthorized parties. The key management system 102 may also provide encryption keys, such as a data key; abbreviated as DK, which may be encrypted further utilizing a managed key, abbreviated as MK, contained within the system. An "encryption key" is an example of a cryptographic protection key, which is a key suitable for use in a cryptographic algorithm (e.g.; encryption algorithm, decryption algorithm, digital signature algorithm) that cryptographically protects an aspect of data, such as by providing secrecy and/or authenticity of the data.

The customer system 106 may be any entity operable to access systems such as the key management system 102 and/or the data storage system 122. In some examples, the customer system 106 may be one or more instances of a physical computing instance, such as a physical server computer; or one or more instances of a virtual computing instance; such as a virtual machine, which may be hosted on one or more computer servers. Additionally, the customer system 106 may include one or more processors, and memory storing instructions executable by the one or more processors, Other variations are also considered as being within the scope of the present disclosure. The customer system 106 may communicate to the key management system 102 and/or the data storage system 122 through one or more communication networks, such as the Internet. Further; the various communications to/from the customer system 106 may be orchestrated by a browser or other application executing on the customer system 106.

In an embodiment, the customer system 106 communicates to the key management system 102 via API (application programming interface) requests, which may be web service API requests. It should be noted that receiving the API request by the key management system 102 may be performed in various ways in accordance with various embodiments. The customer system 106 may utilize a cryptographically protected communications session to communicate to the key management system 102. In various examples, the cryptographically protected communications session may utilize a protocol or application such as TLS (transport layer security), SSL (secure sockets layer), SSH (secure socket shell), VPN (virtual private network), and/or variations thereof. Additionally, the customer system 106 may submit appropriately configured API requests to the key management system 102 through one or more web service interfaces. An API request may be considered to be appropriately configured if it is formatted sufficiently and contains information (e.g., authentication information such as a digital signature or other credential or information generated from a credential) sufficient to cause a receiving system to fulfill the request. Generally, it should be understood that unless explicitly contradicted or otherwise clear from context, the movement of data, and interactions, from one system to another can be performed in any suitable manner, such as in a single transmission, by streaming (i.e. by transmitting the data in pieces over multiple transmissions or otherwise.

The key management system 102 may implement a request API, which, in an embodiment, is an API configured for requesting operations to be performed by the key management system 102. In some examples, the request API may be configured with the following high-level requests available:

CreateKey(KeyID)
Encrypt(KeyID, Data, [AAD])
Decrypt(KeyID, Ciphertext, [AAD])
GenerateDataKey(KeyID)

A CreateKey(KeyID) request, in an embodiment, causes the key management system 102 to create a key identified by the KeyID identified in the request. Alternative embodiments may designate the name of the request performing the CreateKey(KeyID) functionality as create(KeyID), key (KeyID), and/or variations thereof. Upon receipt of a request, the key management system 102 may generate a key and associate the key with the KeyID. It should be known that KeyID's may be, but are not necessarily unique identifiers. For instance, a KeyID may identify a family of keys. It should be noted that, when a KeyID does not uniquely, identify a key, various systems may be in place to enable proper functionality. For example, in various embodiments, a family of keys identified by a KeyID is finite. If a decryption operation using a key identified by a KeyID is requested, additional data (e.g., a time stamp of when the encryption was performed) may enable determining the proper key to use. In some embodiments, ciphertexts may include information indicating a key version. In some embodiments, all possible keys are used to provide different decryptions of the data. Since there are a finite number of keys, the proper decryption may be selected from those provided. In some embodiments, decryption with a key is performed in a manner that enables the key management system 102 to detect that the ciphertext was not generated based at least in part on the key, such as by using authenticated encryption. Other variations are also considered as being within the scope of the present disclosure.

An Encrypt(KeyID, Data, [AAD]) request may be used to cause the key management system 102 to encrypt the specified data using a key identified by the KeyID, which may also be referred to as a "managed key." Additional Authenticated Data (AAD) may be used for various purposes and may be data that is not necessarily encrypted, but that is authenticated, e.g., by an electronic signature, a message authentication code or, generally, a keyed hash value included with the AAD. In some embodiments, the ciphertext is generated including at least a portion of the AAD. In some other embodiments the AAD is provided separately during decryption. In some other embodiments, the AAD is generated at decryption time based at least in part on the request and or other metadata such that decryption will only succeed when the metadata passes. In some embodiments, access control policy (referred to simply as "policy") may constrain whether a cryptographic operation can be performed with respect to particular AAD. Processing of Encrypt(KeyID, Data, [AAD]) requests may require, by programming logic and/or policy enforced by the key management system 102, both that the AAD contain particular values and that the AAD be authentic (e.g., not modified since original transmission). Similarly, a Decrypt(KeyID, Ciphertext, [AAD]) request may be used to cause the key management system 102 to decrypt the specified ciphertext using a key identified by the KeyID. The AAD in the Decrypt(KeyID, Ciphertext, [AAD]) request may be used such as described above. For instance, processing of the Decrypt(KeyID, Ciphertext, [AAD]) may require, by programming logic and/or policy enforced by the key management system 102, both that the AAD contain particular values and that the AAD be authentic (e.g., not modified since original transmission).

The GenerateDataKey(KeyID) request may be used to cause the key management system 102 to generate an encrypted data key using a key identified by the KeyID. Alternative embodiments may designate the name of the request performing the GenerateDataKey(KeyID) functionality as get(KeyID), getKey(KeyID), and/or variations thereof. Upon receipt of a request, the key management system 102 may generate a key and encrypt the generated key using a key specified by the KeyID. In some embodiments, the request may generate a plaintext data key and the corresponding ciphertext copy of the data key, encrypted by the key identified by the KeyID.

The customer system 106 may utilize the GenerateDataKey(KeyID) API request to obtain the response 104, which may comprise an encrypted data key as well as a corresponding plaintext data key. In an embodiment, the customer system 106 submits a request to the key management system 102 to obtain the response 104. The key management system 102 may authenticate the requests, and if authentic, may provide a response 104 that includes a data key encrypted under a managed key, where the managed key may be a key managed for the customer system 106 by the key management system 102, as well as the plaintext data key. In an alternative embodiment, the customer system 106 generates a local data key, and sends the data key in the form of the API request Encrypt(KeyID, Data, [AAD]) to the key management system 102 to be encrypted. Additionally or alternatively, the local data key may be generated or obtained through interfacing with a PKCS (Public-Key Cryptography Standards) 11 provider, such as a locally connected hardware security module, or other various methods. The response 104 may then comprise the encrypted locally generated data key. Upon receipt of the data key and data key encrypted under the managed key, or alternatively the receipt of the encrypted locally generated data key, the customer system 106 may use the data key 110, as well as its own customer secret 108, abbreviated as CS, to encrypt data via the key derivation function 112. In various embodiments, the customer secret 108 is a cryptographic key, passphrase, secret code, biometric authentication information, other supplemental secret, and/or variations thereof that is only known by the customer system 106, and cannot be accessed by the key management system 102.

In an embodiment, the key derivation function 112 is a set of one or more pseudorandom functions, such as a keyed cryptographic hash function, that derive cryptographic keys from one or more input values. In some examples, the key derivation function 112 may derive a cryptographic key by concatenating and/or consolidating one or more of the input values, and performing various mathematical operations on one or more of the input values. The key output from the key derivation function 112 may be a cryptographic protection key, such as the message encryption key 114, abbreviated as MEK. For example, the message encryption key 114 may be the result of a set of processes, by the key derivation function 112, on the customer secret 108 and the data key 110, as well as one or more other input values. The output message encryption key 114 may be used to encrypt data, such as the data 116, present on the customer system 106. In various embodiments, the message encryption key 114 requires a multi-factor process to recreate, as the inputs utilized in the key derivation function 112 to create it originate from two separately managed systems, namely the customer system 106 and the key management system 102. Further information regarding the key derivation function 112 and its functionalities can be found in the descriptions of FIG. 2 and FIG. 3.

In some examples, the encryption algorithm 118 is one or more cryptographically strong algorithms, such as algorithms that encrypt data in a manner rendering the encrypted data impractical to decrypt without access to a secret cryptographic protection key, such as the message encryption key 11A, usable to decrypt the data. The processes of the encryption algorithm 118 on a data object may result in cryptographically protected data. The encryption algorithm 118 may also include one or more of the following cryptographic processes: encryption, digital signatures, or otherwise generating data that provides secrecy and/or integrity of the data. The encryption algorithm 118 may encrypt data, such as the data 116, using a cryptographic cipher that uses the message encryption key 114 as input. In some examples, the message encryption key 114 may be a symmetric key of a private key cryptosystem, also known as symmetric key algorithms. Examples of cryptographic ciphers within symmetric key algorithms include, for example, modes of the Advanced Encryption Standard (AES), Blowfish, Data Encryption Standard (DES), Triple DES, Serpent, Twofish, and/or variations thereof. The encryption algorithm 118 may use the message encryption key 114 to encrypt the data 116, which may be an object of data such as a sequence of bits; to produce message encryption key encrypted data. The message encryption key encrypted data may be contained in a generated data object, such as the message encryption key encrypted data object 120. Further information regarding the structure of the data object 120 can be found in the descriptions of FIG. 5 and In various embodiments, the data storage system 122 stores data objects, such as the message encryption key encrypted data object 120; on behalf of users of the data storage system 122. The data storage system 122 may be a collection of computing resources, physical and/or virtual, configured to operate, store; and/or access data. The data storage system 122 may store data objects on one or more physical computing instances, such as a physical computing server, or one or more virtual computing instances, such as a virtual machine; these computing instances may also be a part of a larger network of computing instances. Additionally, the data storage system 122 may store the data in a single and/or multiple parts. Generally, it should be understood that unless explicitly contradicted or otherwise clear from context, the storage of data, within one or more systems, can be performed in any suitable manner, such as in a single location, multiple locations (i.e. by storing the data in pieces over multiple locations), or otherwise.

In some examples, the data storage system 122 is hosted and operated by a computing resource service provider as a service for the users, which may include device systems such as the customer system 106. Customer systems, such as the customer system 106, may upload data objects to the data storage system 122 for storage by the data storage system 122. In some embodiments; the data storage system 122 provides a web service API and the customer systems remotely manage their data through the API. For instance, the customer system may submit web service calls to upload data to the data storage system 122, to retrieve data from the data storage system 122 and to perform other operations, to obtain an inventory of data objects stored by the data storage system 122, and/or to perform other operations. In some examples, the API includes the following, high-level requests:

Put(ObjectID, DestinationID)
Get(ObjectID, DestinationID)
Delete(ObjectID, DestinationID)

The Put(ObjectID, DestinationID) request, in an embodiment, causes the data storage system 122 to electronically store a data object; specified by ObjectID, into a destination, specified by DestinationID. In various examples, the name of the request performing the Put(ObjectID, DestinationID) functionality may be alternatively designated as insert(ObjectID, DestinationID), and/or variations thereof. In some examples, the customer system 102 may utilize the Put(ObjectID, DestinationID) request to store the message encryption key encrypted data object 120 in the data storage system 122. The ObjectID may specify a location of a data object; the location of the data object may refer to a physical location, such as one or more physical computers, or a virtual location; such as one or more virtual machines. The data object may additionally or alternatively be stored on the same or a different data storage system, in which the ObjectID may refer to a location on an existing data storage system. The DestinationID may refer to a location on the data storage system 122; if a destination identified by DestinationID does not exist, the data storage system 122 may generate the destination location, and/or return an error message.

Similarly, the Get(ObjectID, DestinationID) request may be used to retrieve a data object, specified by ObjectID, into a destination, specified by DestinationID. Additionally, the Delete(ObjectID, DestinationID) request may be used to delete a data object, specified by ObjectID, located in a destination specified by DestinationID. Generally, it should be noted that, unless explicitly contradicted or otherwise clear from context, the nomenclature of an API request performing a specific functionality may vary based on the specific implementation context of the API.

Figure 2:
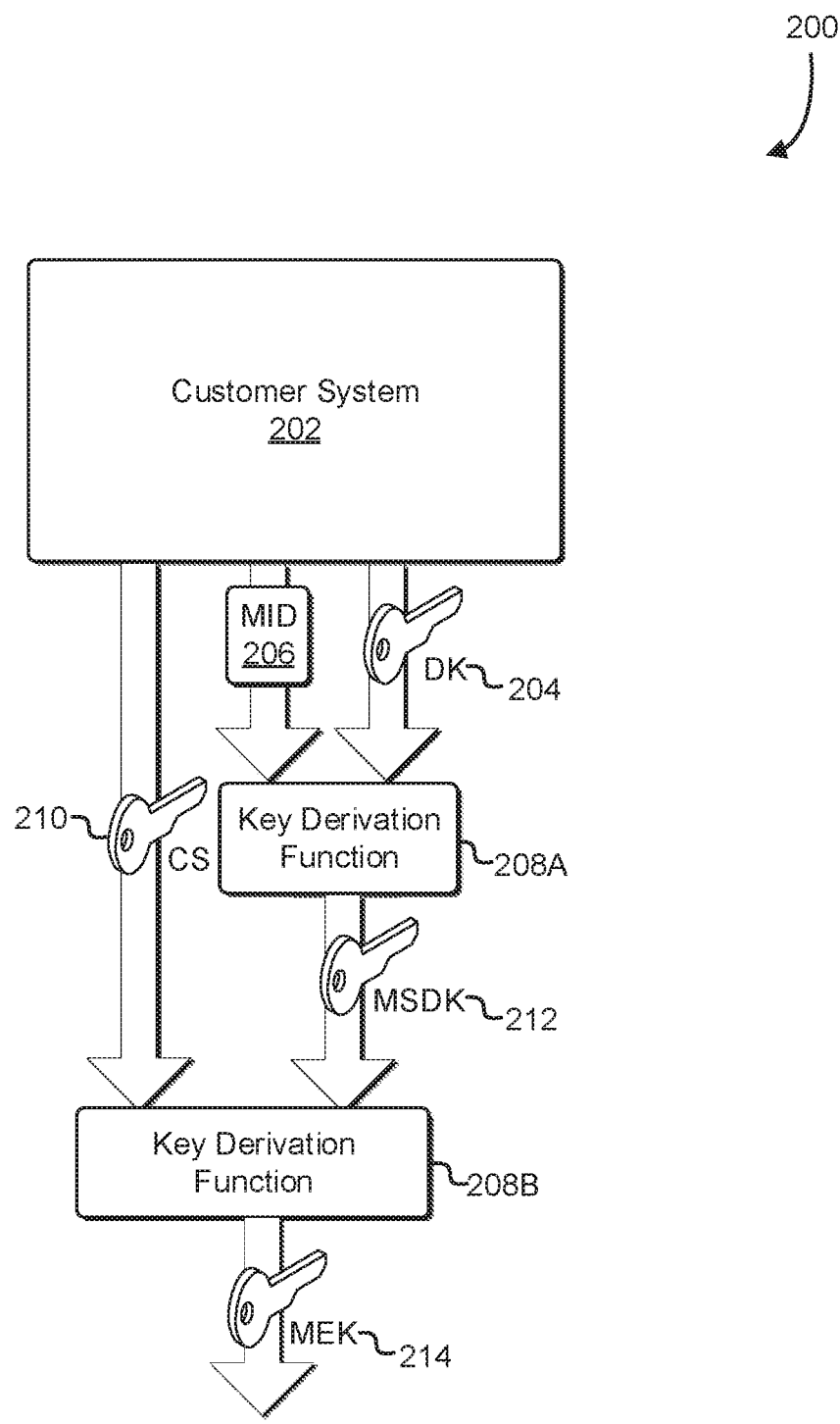
FIG. 2 shows an illustrative example for how various components in accordance with several embodiments may be implemented.

FIG. 2 illustrates a diagram 200 in which various embodiments can be implemented. Specifically, FIG. 2 depicts a process a customer system 202 may utilize to generate a cryptographic protection key, specifically a message encryption key 214, abbreviated as MEK. In an embodiment, the customer system 202 uses a message identifier 206, abbreviated as MID, as well as a data key 204 as inputs into an initial key derivation function 208A. The message identifier 206 may include data that can identify (e.g., uniquely identify) a specific message or data object. The message identifier 206 may be a hash value, produced from the output of a hash function applied to the message/data object. Additionally, the message identifier 206 may be a random number, a sequence number that is updated, a uniform resource identifier (UM), and/or variations thereof. In some examples, the message identifier may be used to identify specific messages and/or data objects that are being encrypted.

The key derivation function 208A-08B, in an embodiment, is a set of one or more pseudorandom functions, such as a keyed cryptographic hash function, that derive cryptographic keys from one or more input values. The input values may include other cryptographic keys, plaintext, ciphertext, and/or various combinations thereof. For example, the key derivation function 208A may receive as inputs a plaintext message identifier, such as the message identifier 206, as well as a cryptographic key, such as the data key 204. The key derivation function 208A may derive a new unique cryptographic key from the inputs through a number of processes, which may include concatenation of the inputs, utilizing the inputs in a mathematical function, and/or variations thereof. In some examples, the key derivation function 208A-08B may be hash-based message authentication code (HMAC) based, such as the HMAC based key derivation function (KDF) described in RFC (Request For Comments) 5869. The HMAC based KDF may include, but is not limited to, cryptographic hash functions such as the secure hash algorithm (SHA) family. Examples of the potential SHA utilized may include SHA-224, SHA-256, SHA-384, SHA-512, and/or variations thereof. In an embodiment, the key derivation function 208A is the same as the key derivation function 208B, although the key derivation functions 208A and 208B may be different in some embodiments. Other variations of the key derivation function are also considered as being within the scope of the present disclosure.

The customer system 202 may input to the key derivation function 208A a message identifier 206 and a data key 204. The data key 204 may be obtained through various methods, as discussed in the description of FIG. 1. The data key may be obtained either as a locally generated key, a key received through an API request to a key management system, such as the key management system 102, or through other methods, such as interfacing with a PKCS 11 provider. The message identifier 206, as discussed in the preceding paragraphs, may be utilized to identify specific data objects or messages to be encrypted. The message identifier 206 may also be utilized to obviate the need for multiple data keys. For example, a message identifier may be utilized so a large set of data may be encrypted without Obtaining specific data keys for each data object within the set. This may be achieved by utilizing a unique message identifier for each data object, and a singular data key for all data objects, as inputs to the key derivation function 208A, resulting in the generation of a unique key for each unique message identifier; each unique key being associated with a specific data object of the set. This may result in less computational resources utilized when compared to generating a unique data key for each data object within the set. In some embodiments, the unique key generated is the message specific data key 212, abbreviated as MSDK.

The message specific data key 212 may be used, as well as a customer secret 210, abbreviated as CS, by the customer system as inputs to the additional key derivation function 208B. In an embodiment, the customer secret 210 is a cryptographic secret present on the customer system 202. In various examples, the customer secret 210 may be a cryptographic key, passphrase, secret code, biometric authentication information, other supplemental secret, and/or variations thereof that is inaccessible to a key management system, such as the key management system 102. The customer secret 210 may be stored on a variety of devices present within or accessible to the customer system 202, including but not limited to hardware security modules, networks of one or more physical and/or virtual computing instances, and/or variations thereof. In an embodiment, regardless of the location of the customer secret 210, a key management system, such as the key management system 102, cannot access the customer secret 210 in any capacity.

The key derivation function 208B may receive as inputs a customer secret 210, and a message specific data key 212, as discussed in the preceding paragraphs. The key derivation function 208B may then derive a new cryptographic protection key from the inputs. In some examples, the new cryptographic protection key may be the message encryption key 214. The message encryption key 214 may then be output to be utilized to encrypt a message. Additionally or alternatively, the message encryption key 214 may also be utilized as an input to one or more additional key derivation functions, which may utilize one or more additional customer secrets. Other variations, such as cascading multiple key derivation functions, are also within the scope of the present disclosure. In various examples, the message encryption key 214 requires a multiple-factor process to recreate, as the inputs utilized in the key derivation function 208B to create it may originate from separately managed systems, such as the customer system 202, a key management system, such as the key management system 102, and/or elsewhere.

Figure 3:
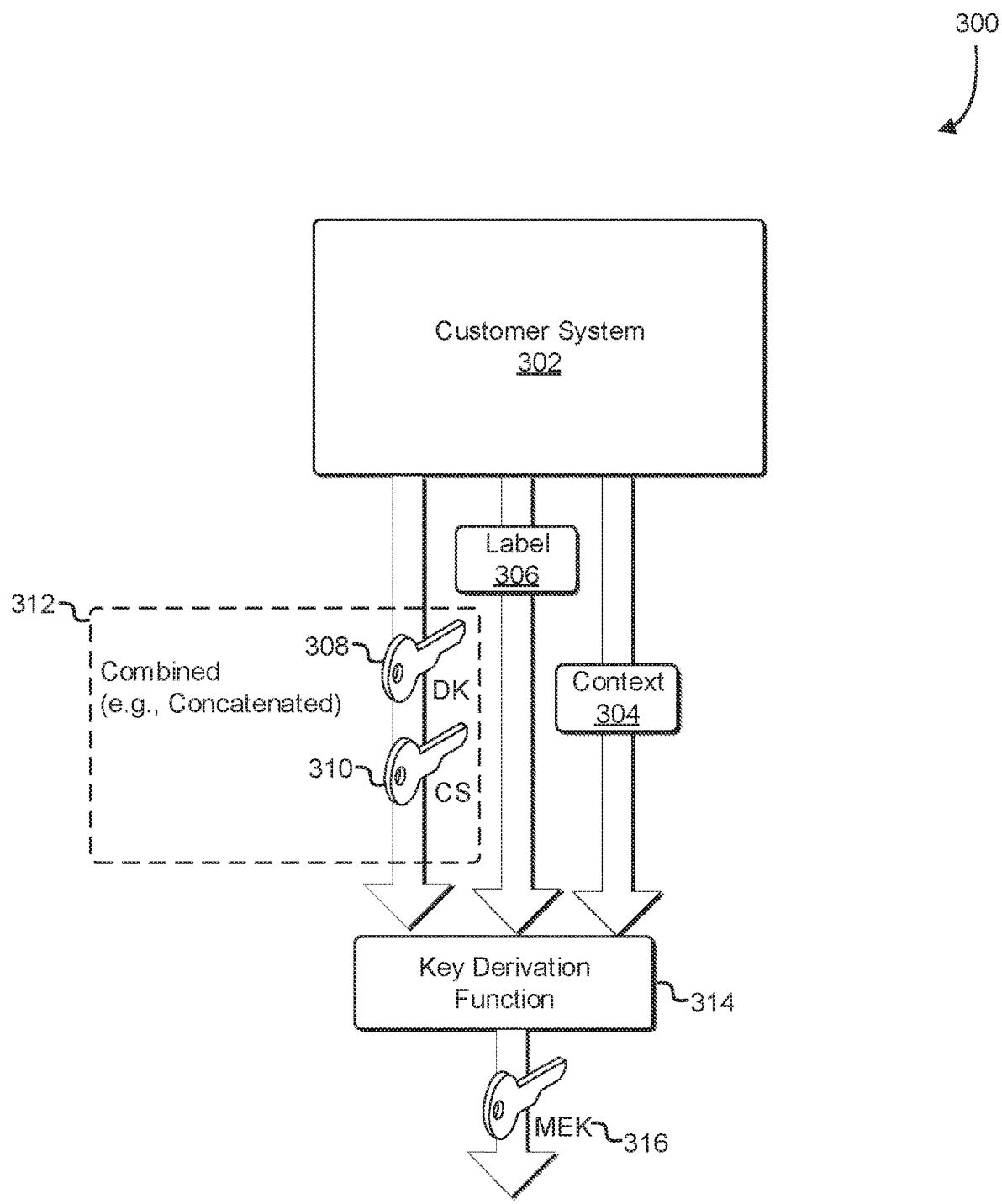
FIG. 3 shows an illustrative example for how various components in accordance with several embodiments may be implemented.

FIG. 3 illustrates a diagram 300 in which various embodiments can be implemented. Specifically, FIG. 3 depicts a process, alternative to the processes described in FIG. 2, a customer system 302 may utilize to generate a message encryption key 316. In an embodiment, the customer system 302 uses a concatenation 312 (or other combination) of a data key 308 and customer secret 310, a label 306, and a context 304 as inputs into a key derivation function 314 to generate the message encryption key 316. In some examples, the data key 308 is a cryptographic key obtained through a local generation of the key, an API request to a key management system, such as the key management system 102, or through other methods, such as interfacing with a PKCS 11 provider. The customer secret 310 may be a cryptographic key; passphrase, or other supplemental secret that exists on the customer system 302 and is inaccessible to the key management system 102.

In an embodiment, the label 306 is a string of ASCII (American Standard Code for Information Interchange) characters that uniquely identifies the key derivation function 314. The label 306 may be present in the generated message encryption key 316 in the form of cipher text and/or plaintext. The label 306 may be utilized to distinguish the key derivation function 314 from other key derivation functions. Additionally or alternatively, the label 306 may be utilized to recreate the generated message encryption key 316; the specific key derivation function to utilize may be indicated by the label 306. For example, a system may have obtained all of the cryptographic keys input into a particular key derivation function. The system may then proceed to recreate the generated message encryption key; the label 306 may indicate which specific key derivation function(s) to utilize on the inputs to generate the original message encryption key. In another example, two key derivation functions may have the same output. The label 306 then may be used to differentiate between the two key derivation functions utilized in each output.

The context 304 may include data that can identify a specific message or data object. The context 304 may be of the format of a hash value, produced from the output of a hash function. Additionally, the context 304 may be a random number, a sequence number that is updated, a uniform resource identifier (UM), and/or variations thereof. In some examples, the context 304 may be used to identify specific messages and/or data objects that are being encrypted. In an embodiment, the context 304 serves the same function as the message identifier 206. The key derivation function 314 may utilize the context 304, label 306, and concatenation 312 of the data key 308 and customer secret 310 as inputs to derive a message encryption key 316. In some examples, the concatenation 312 of the data key 308 and customer secret 310 may entail combining the two, in a specific permutation that may vary, in series. Further information regarding the processes of the key derivation function 314 may be found in the description of FIG. 2. Like the message encryption key 214 of FIG. 2, in various examples, the message encryption key 316 requires a multiple-factor process to recreate, as the inputs utilized in the key derivation function 314 to create it may originate from separately managed systems, such as the customer system 302, a key management system, such as the key management system 102, and/or elsewhere.

Note that, while various embodiments illustrated herein use a single customer secret for derivation of the message encryption key for the purpose of illustration, multiple customer secrets may be used in deriving a message encryption key and the techniques described herein may be adapted as such. For example, multiple customer secrets may be combined (e.g., through concatenation or another operation) and input into a key derivation function, such as described above. As another example, a message encryption key generated as described above may be input into the same or another key derivation function along with another customer secret to generate another message encryption key. Such a process may be performed successively using multiple successive customer secrets. In some embodiments, different entities have access to different customer secrets, where example such entities comprise customers, computing resource service providers, contractors, and other entities, and the multiple customer secrets may be used to derive a single message encryption key. In this manner, access to some, but not all customer secrets is insufficient to access data. Generally, techniques described herein may be adapted to utilize multiple customer secrets under control of (e.g., accessible to) different entities to prevent any single entity from unilaterally being able to decrypt data, thereby increasing security of the data.

Figure 4:
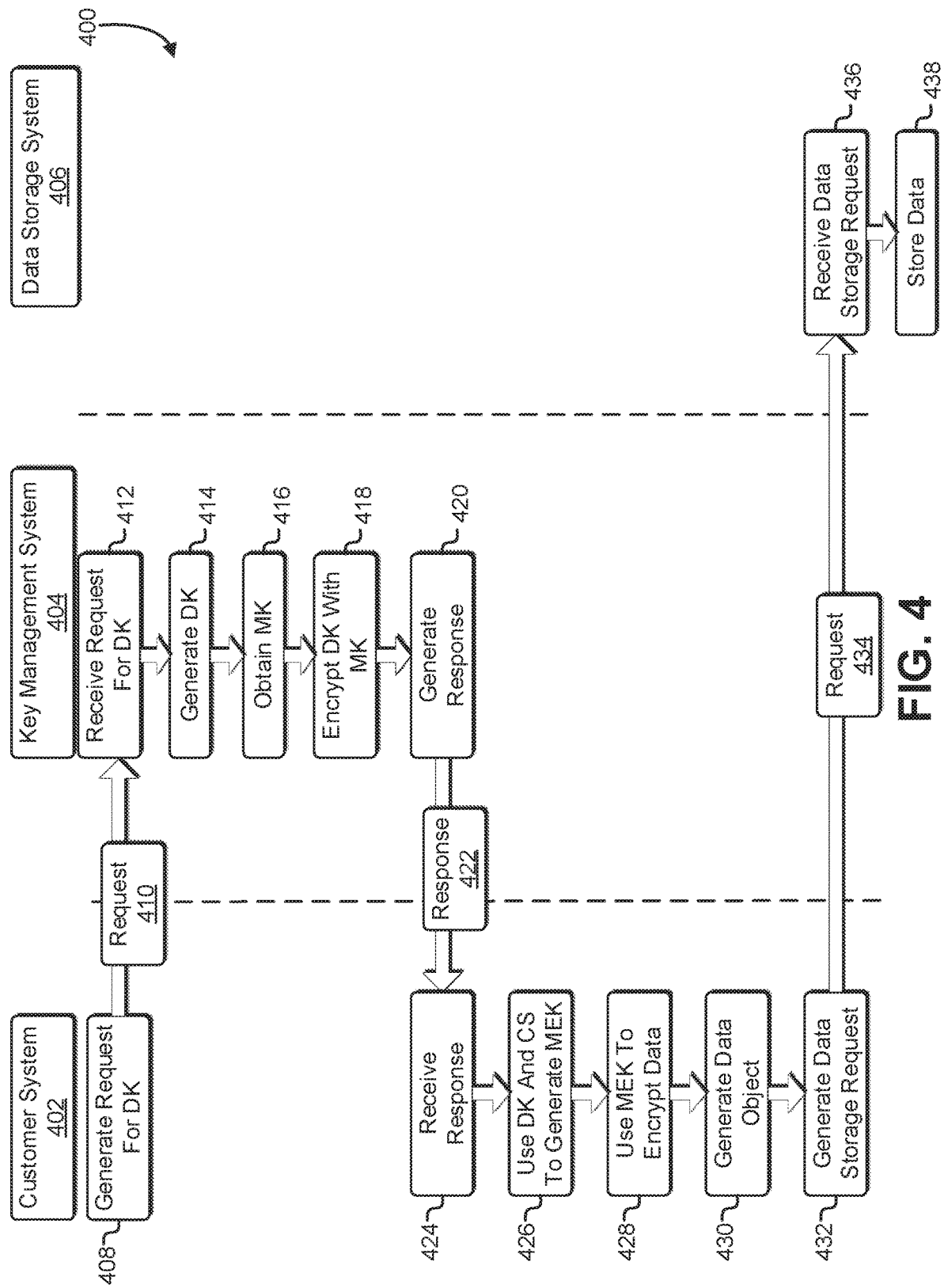
FIG. 4 shows an illustrative example of storing data securely using multi-factor encryption.

FIG. 4 illustrates an example of an environment 400 in which data may be securely encrypted and stored in accordance with various embodiments. The environment 400 may be utilized by a set of suitable systems, such as the customer system 106, the key management system 102, and the data storage system 122 as described in the description of FIG. 1, In an embodiment, the environment 400 includes generating a request for a data key 408 by the customer system 402 to the key management system 404. The customer system 402 may, for instance, submit an appropriate configured API call in the form of the request 410. The request 410 may be configured as the following example API request, GenerateDataKey(KeyID), in which the KeyID may refer to the specific key the key management system 404 may utilize to encrypt the data key. It should be noted that receiving the request for the data key 410 by the key management system 404 may be performed in various ways in accordance with various embodiments. For instance, the key management system 404 may receive the request through one or more web service interfaces implemented. Additionally, the movement of data may utilize a cryptographically protected communications session, which may utilize a protocol such as TLS (transport layer security), SSL (secure sockets layer), SSH (secure socket shell), VPN (virtual private network), and/or variations thereof.

Upon receiving the request 410 for a data key 412, the key management system 404 may generate the data key 414 requested. The data key may be generated through a sequence of mathematical functions. In some examples, the data key may be generated using a random number generator or a pseudorandom number generator. Alternatively, the data key may be derived deterministically using a key derivation function and a passphrase. In an embodiment, an HSM or other device providing hardware-based protection for cryptographic secrets and/or cryptographically secure random number generation is used by the key management system 404 to generate the data key. The key management system may obtain a managed key 416 to encrypt the generated data key with. In some examples, the managed key 416 is a key specified by the request 410. For example, a customer system 402 may generate a request utilizing the following example API request, GenerateDataKey(XXX). The key management system 404 may then refer to a managed key, under the KeyID: XXX, to encrypt the generated data key. In some embodiments, the key management system 404 may obtain an encrypted copy of the managed key from a storage system (e.g., the data storage system) and use a key securely stored in an HSM to decrypt the encrypted managed key to obtain the managed key. In other examples, the HSM may store the managed key locally and the managed key may be obtained from local memory.

The managed key may be utilized to encrypt the obtained data key 418, In some examples, the data key may be encrypted using a cryptographic cipher that uses the managed key as input. Additionally, the managed key may be symmetric key of a private key cryptosystem, also known as symmetric key algorithms. Examples of cryptographic ciphers and symmetric key algorithms can be found in the description of FIG. 1. The key management system may then generate a response 420 consisting of the encrypted data key, and/or the plaintext equivalent data key 422.

The customer system 402 may receive the response 424 comprising an encrypted data key and/or a plaintext data key. The customer system 402 may utilize the received plaintext data key, as well as another component, also known as a customer secret, to generate a message encryption key 426. In some examples, the customer secret is a cryptographic key, passphrase, or other supplemental secret that may be present on the customer system 402, and may be completely inaccessible to the key management system 404. In other examples, the customer secret may be present in hardware security modules, networks of one or more physical and/or virtual computing instances, and/or variations thereof; all may be inaccessible to the key management system 404. The message encryption key may be generated through the usage of a key derivation function, utilizing the customer secret and the data key as inputs. Further information regarding the key derivation function can be found in the descriptions of FIG. 2 and FIG. 3.

The message encryption key may be utilized by the customer system 402 to encrypt or otherwise cryptographically protect data 428. The data to be encrypted may be an object of data, such as a sequence of bits, stored by a data storage system. The data object may alternatively be stored within the customer system 402. In some examples, the data object may be stored on one or more physical computing instances, such as a physical computing server, or one or more virtual computing instances, such as a virtual machine. The data object may also be stored locally on computing devices, such as a mobile device and/or a personal computing device, or remotely, such as a network of connected computing servers and/or devices. The data object may be encrypted using the message encryption key received. In some examples, encryption may also in addition to one or more of the following cryptographic processes that may result in cryptographically protected data: encryption, digital signatures, or otherwise generating data that provides secrecy and/or integrity of the data. The encryption of the data may also be done using a cryptographic cipher that uses the message encryption key as input. Additionally, the message encryption key may be symmetric key of a private key cryptosystem, also known as symmetric key algorithms. Examples of cryptographic ciphers and symmetric key algorithms can be found in the description of FIG. 1.

The encrypted data may then be stored in a generated data object 430, which may then be stored in a data storage system 406 via the generation of a request 432 from the customer system 402. Further information regarding the generated data object can be found in the descriptions of FIG. 5 and FIG. 6. The customer system 402 may, for instance, submit an appropriate configured API call to the data storage system 406 in the form of the request 434. The request 434 may be configured as the following example API request, Put(ObjectID, DestinationID), in which the ObjectID may refer to the specific location the generated data object may be located. DestinationID may refer to a specific location that the generated data object may be stored. The data storage system 406 may receive the request 436 in a manner similar to the key management system 404 receiving the request 410, as described in the preceding paragraphs. Following the receipt of the data storage request 436, the data storage system 406 may store the data 438 in a manner described in the description of FIG. 1.

Figure 5:
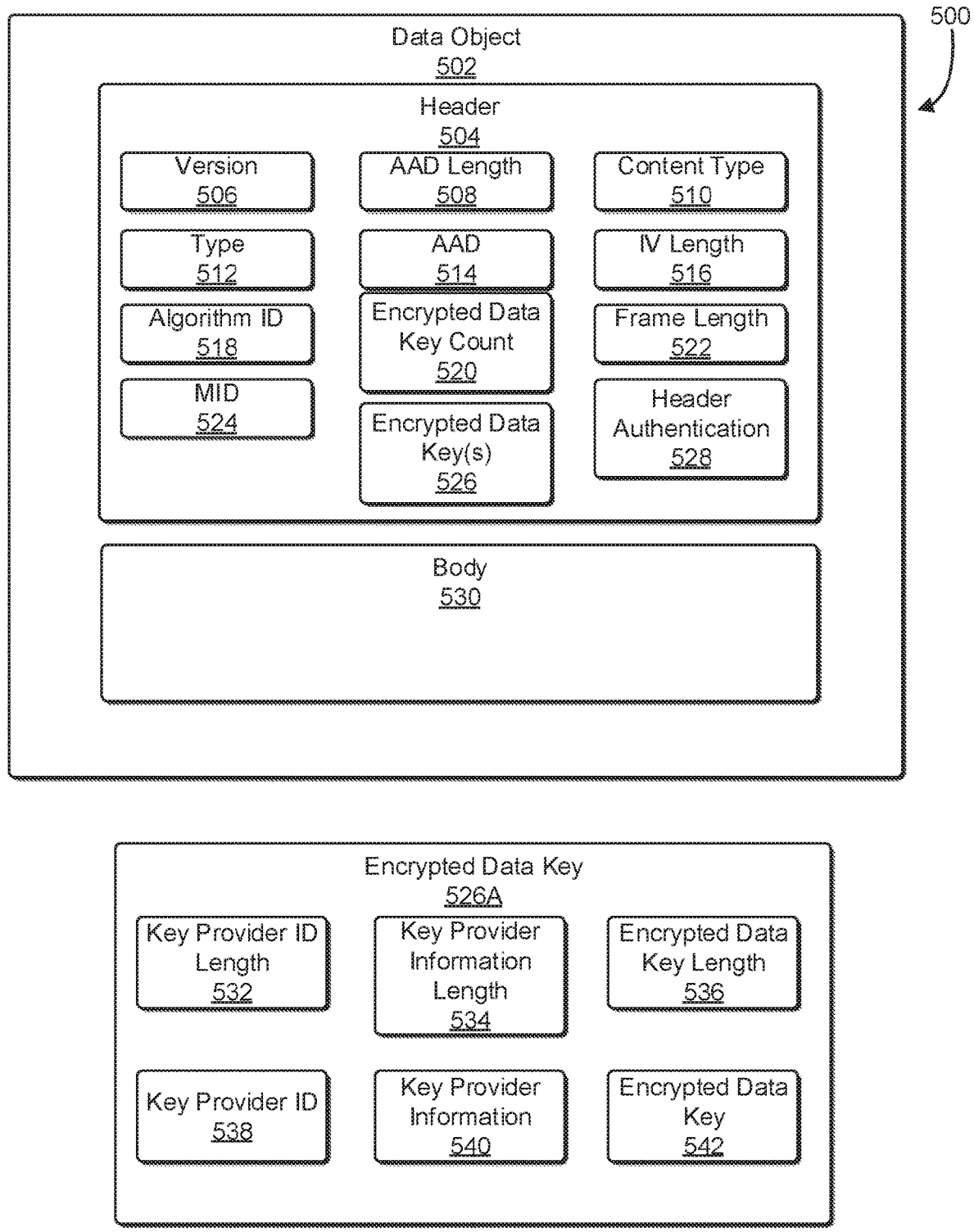
FIG. 5 shows an illustrative example of a data object storing encrypted data in accordance with at least one embodiment.

FIG. 5 illustrates an example 500 of a data object 502 storing encrypted data in accordance with various embodiments. Specifically, FIG. 5 illustrates a format in which a data object, such as the message encryption key encrypted data object 120, may be of the format of. In some examples a system, such as the customer system 102, may generate the data object 502 to store encrypted data. In an embodiment, the data object 502 comprises two main sections, a header 504, and a body 530, which is depicted in greater detail in FIG. 6. In various examples, the data object 502 may have additional sections not shown in FIG. 5; these variations are also considered as being within the scope of the present disclosure.

The header 504 may comprise several components denoting various attributes of the data object 502. The version 506 may be an integer value referring to a version of the data object 502 itself. In some examples, the version 506 may be utilized to differentiate between various iterations of the data object 502, The version 506 may enable any suitable system to retrieve the latest version of the data object 502. The additional authenticated data 514, abbreviated AAD, may be an encoding of a context in which the encryption of the data occurred. The AAD 514 may be used for various purposes and may be data that is not necessarily encrypted, but that is authenticated. In some embodiments, the ciphertext is generated including at least a portion of the AAD 514. In other embodiments, the AAD 514 is provided separately during encryption, and policy may constrain whether a cryptographic operation can be performed with respect to a particular AAD 514.

The AAD length 508 may be an integer value denoting the length of the AAD 514. In some examples, if no encryption context is specified, the AAD length 508 may be 0. The content type 510 may be an integer value referring to the type of the encrypted content stored within the data object 502. In some examples, the content type 510 may denote, with either a 0 or a 1, whether the encrypted content is broken into parts, or frames, which may be known as framed content, or remains whole, which may be known as non-framed content. Further information regarding framed and non-framed data can be found in the description of FIG. 6.

The type 512 may refer to the type of the encrypted data. The type 512 may be an integer value that must be utilized in reference to a table to determine which values correspond to which types. The type 512 may be utilized by a system storing the data object 502; the type 512 may denote a specific location the data object 502 may be stored. For example, the type 512 may include data that identifies the data object 502 as encrypted media data. A storage system may then store the data object 502 in an "encrypted media data" storage location. The IV length 516 may refer to the length of the IV, or initialization vector. The IV length 516 may be an integer value; further information regarding the initialization vector may be found in the description of FIG. 6. In an embodiment, the algorithm II) 518 denotes the specific algorithm utilized in encrypting the content stored within the data object 502. The algorithm ID 518 may be an integer value; for example, the algorithm ID 518 may have the value 0. This may correspond to a specific encryption algorithm, such as AES-256. Alternatively, the algorithm ID 518 may have the value 1, This may correspond to a different, specific encryption algorithm, such as AES-192. The integer values may utilize a table containing the encryption algorithms and the values they correspond to; the permutation of the table with respect to specific integer values may vary.

The frame length 522 may be an integer value that refers to the length of each frame of the encrypted content. In various embodiments, a frame is one of a sequence of frames that each contain a portion of the encrypted content. In some examples, the encrypted content may be un-framed; this may result in the frame length 522 having the value 0. The message ID 524, abbreviated MID, may be a numerical value that uniquely identifies the encrypted content stored within the data object 502. In some examples, the message ID 524 is utilized to encrypt multiple data objects with a singular data key; a data key may be utilized along with the message ID in a key derivation function to generate a unique encryption key. The header authentication 528 may be an encoding of an authentication of the header 504. The header authentication 528 additionally may be a result of the one or more encryption algorithms utilized to encrypt the data stored in the data object 502. In some examples, the header authentication 528 may be utilized to ensure the contents of the data object 502, specifically the header 504, are legitimate; without it, a system may be unable to authenticate the data object 504.

In an embodiment, the encrypted data key(s) 526 refer to the encrypted data key(s) utilized to create the encrypted content stored within the data object 502. The format of an encrypted data key can be found below. Correspondingly, the encrypted data key count 520 may, be an integer value of the number of encrypted data keys utilized to create the encrypted content stored.

The encrypted data key 526A, which may be a one or more of the encrypted data key(s) 526; may comprise several components denoting various attributes of the encrypted data within the data object 502 and, in particular, attributes of key(s) used to encrypt or otherwise cryptographically protect the data. There may be one encrypted data key 526 for each data key used to encrypt the data in the header 526. The key provider ID 538 may indicate the provider of a data encryption key utilized to encrypt the data within the data object 502. In some examples, the key provider may be a customer system, such as the customer system 106, a key management system, such as the key management system 102, or some other third party system. The key provider ID 538 may identify where the data encryption key originated from. Correspondingly, the key provider II) length 532 may be an integer value of the length of the key provider II) 538. The key provider information 540 may refer to information the provider of a data encryption key, utilized to encrypt the data within the data object 502, provides as a result of the utilization of the data encryption key. In some examples, the key provider information 540 may contain metadata identifying certain facets of the origin of a data encryption key, such as the name of the data encryption key, or specific resources that were utilized in the generation of the data encryption key. Correspondingly, the key provider information length 534 may be an integer value of the length of the key provider information 540.

In an embodiment, the encrypted data key 542 is an encrypted version of a data encryption key utilized to encrypt the data stored within the data object 502. The encrypted data key 542 may be encrypted by a key management system, such as the key management system 102, or other various methods. Correspondingly, the encrypted data key length 536 may be an integer value of the length of the encrypted data key 542. It should be noted that in some examples, the encrypted data key(s) 526 may not contain all of the data encryption keys utilized to encrypt the data stored in the data object 502. For example, an encrypted data key stored on the data object 502 may be decrypted. The decrypted data key may then require another key, which may be supplied by a customer system or another third party source, in a function such as a key derivation function to generate an encryption key to decrypt the data stored within the data object 502.

In an embodiment, an encrypted data key 526A in the header 504 of the data object 502 comprises information usable to determine (e.g., lookup) the customer secret. As an example, the key provider information 540 for the customer secret may indicate that the encrypted data key 526A is for a customer secret. The Key Provider ID field 538 may be populated with a value or set of values that enables determination of the secret, such as by storing an identifier of the customer secret where the customer secret is stored by a data storage system (e.g., database) of the customer in association with the identifier, a hint for a passphrase, an encrypted version of the customer secret (e.g., encrypted to be decryptable by the customer or by another system under authorization of the customer) and/or other information that is usable (e.g., sufficient) to determine the customer secret. In some embodiments, for the customer secret, fields of the encrypted data key 526A may be blank (e.g., null), such as the encrypted data key 542 and the encrypted data key length 536. In some examples, the encrypted data key length for the customer secret specifies the length of the customer secret. In some embodiments, null values in the encrypted data key 526A serves as an indicator that data stored in the encrypted data key 526A serves to be information usable to determine the customer secret.

Figure 6:
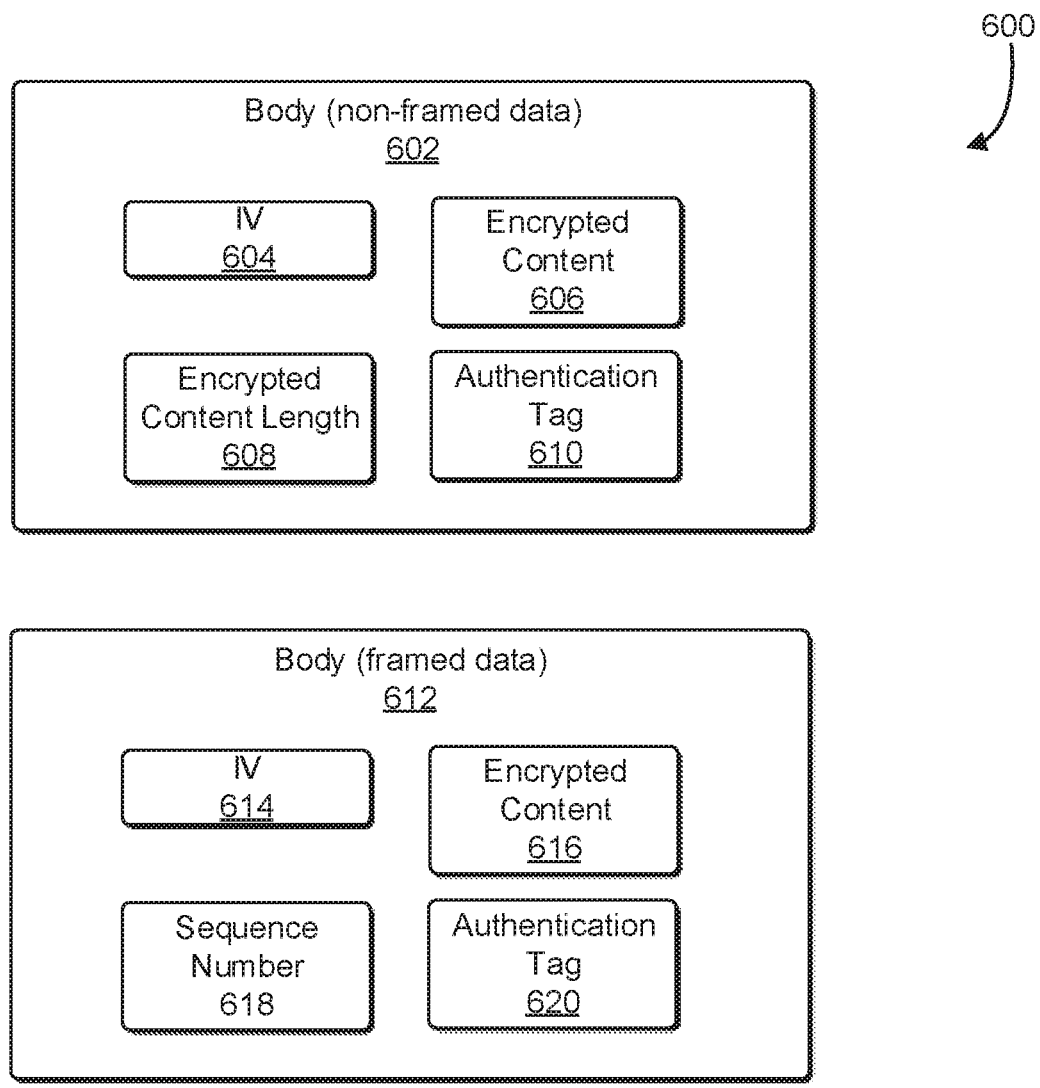
FIG. 6 shows an illustrative example of a body and an alternative body of a data object storing encrypted data in accordance with at least one embodiment.

FIG. 6 illustrates an example 600 of a body and an alternative body of a data object storing encrypted data. The data object may be the same or different as the data object 502. Additionally, the body and an alternative body may both be variants of the body 530. Specifically, FIG. 6 depicts the format in which the body of a data object, such as the body 530 of the data object 502, may be formatted. In various examples, the structure of the body may vary dependent on the structure of the data stored. For example, the structure shown as body 602 may apply to storing non-framed data; the structure shown in body 612 may apply to storing framed data. Other variations are also considered as being within the scope of the present disclosure.

In some examples, non-framed data may refer to data that has been stored as a singular unit or Object. This may require that the data not undergo any variation of a division or fragmentation function in its storage that may potentially divide the data into several parts. Framed data may refer to data that has been divided into equal-length parts. This may require the data to undergo a division or fragmentation function that may divide the data into several equal-length parts to be stored. In many examples, framed data may be alternatively designated as segmented data, and/or variations thereof, and non-framed data may be alternatively designated as non-segmented data, and/or variations thereof. Generally, it should be noted that, unless explicitly contradicted or otherwise clear from context, the nomenclature of data that has been divided and data that has remained whole may vary based on the specific implementation context of the data.

In an embodiment, the body 602 depicts the structure of the body within a data object, such as the data object 502; body 602 specifically refers to a data object that stores non-framed data. The initialization vector 604, abbreviated as IV may be a numerical value that is required to initialize a cryptographic function, such as the one or more cryptographic functions utilized to encrypt the encrypted content 606. The initialization vector 604 may also be utilized to further encrypt a cryptographic function. For example, a cryptographic function may be utilized several times to encrypt several data objects. This may result in several encrypted objects sharing commonalties in their encryption; this phenomena may enable a malicious user to decrypt the encrypted data object by cross referencing outputs in a table, which in some examples may be known as a rainbow table. An initialization vector, such as the initialization vector 604, may be utilized as an additional input to the cryptographic function to prevent this; a different initialization vector may be utilized for each data object, resulting making the reconstruction of the decrypted data by cross referencing and analyzing the encrypted data infeasible. In some examples, the initialization vector 604 may be utilized to facilitate the decryption of the encrypted content 606; the initialization vector 604 may be required as an input to the one or more decryption processes.

In embodiments, the encrypted content 606 is the content that has been encrypted and stored within the data object 502. Correspondingly, the encrypted content length 608 may be an integer value of the length of the encrypted content 606. The encrypted content 606 may be the result of one or more cryptographic functions and/or algorithms on a data object to encrypt the data object. Further information regarding the encryption algorithms can be found in the description of FIG. 1. The encrypted content 606 may also be in the format of ciphertext. The authentication tag 610 may comprise a numerical value that may authenticate the encrypted content 606, Without a proper authentication tag 610, a system may be unable to verify the authenticity and/or legitimacy of the encrypted content 606. In some examples, the authentication tag 610 may be a result of one or more encryption algorithms utilized to encrypt the encrypted content 606.

In an embodiment, several components of the framed data body 612, namely the initialization vector 614, encrypted content 616, and authentication tag 620, serve the exact same functionality as the following components of the non-framed data body 602, namely the initialization vector 604, encrypted content 606, and authentication tag 610, respectively, with the exception that the framed data body 612 is one of a sequence of framed data bodies, each containing encrypted content 616 that is a piece of a larger, whole encrypted content, whereas a single non-framed data body 602 contains encrypted content 606 that is the whole encrypted content, and not a part of a larger whole. In embodiments, the sequence number 618 is an integer value that serves as an incremental counter for each frame the encrypted data comprises. In some examples, the framed data body 612 may be one of several framed data bodies; the frame data bodies may each contain an encrypted part of a larger whole encrypted content. The sequence number 618 may be utilized to differentiate between the framed data bodies, and specify what order the framed data bodies may have been processed. The sequence number 618 may also be utilized for decryption; the correct order of the framed data bodies may be indicated by the sequence number 618 so decryption may proceed in the correct order.

Figure 7:
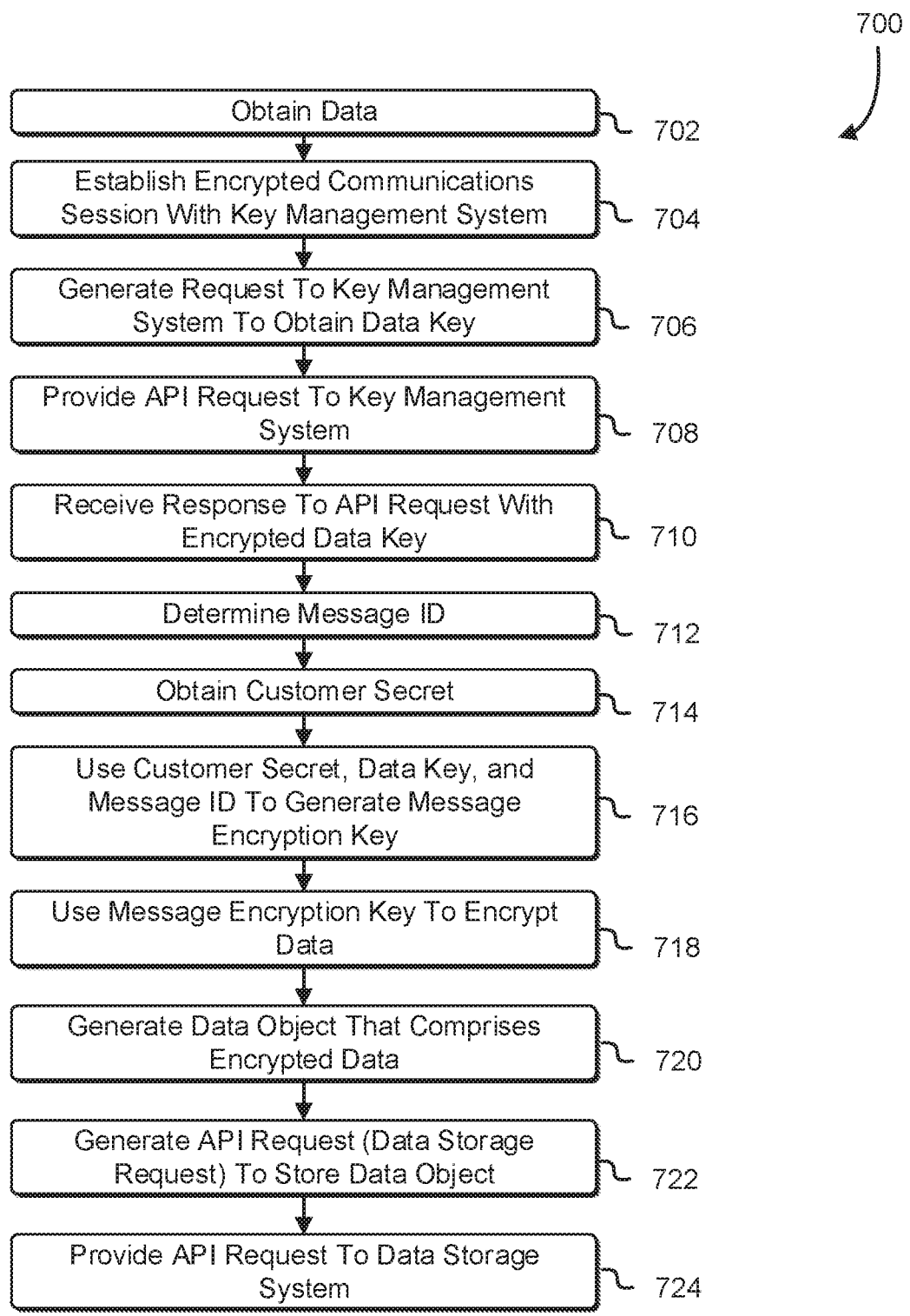
FIG. 7 shows a diagram illustrating a process for a system to encrypt data and store a data object that comprises encrypted data.

FIG. 7 illustrates an example of a process 700 that may be performed to obtain, encrypt, and store data in accordance with various embodiments. The process 700 may be performed by any suitable system, such as by a computer system of a customer configured with executable instructions for communicating with one or more other systems. In an embodiment, the process 700 includes a system obtaining data 702 to be encrypted. The data obtained may be an object of data, such as a sequence of bits, stored by a data storage system. Alternatively, the data object may be stored within a customer system, such as the customer system 106. In some examples, the data object may be stored on one or more physical computing instances, such as a physical computing server, or one or more virtual computing instances, such as a virtual machine. The data object may also be stored locally on computing devices, such as a mobile device and/or a personal computing device, or remotely, such as a network of connected servers and/or devices.

A system performing the process 700 may establish an encrypted communications session with a key management system 704. In some embodiments, an encrypted communications session may utilize a protocol or application such as TLS (transport layer security), SSL (secure sockets layer), SSH (secure socket shell), VPN (virtual private network), and/or variations thereof. Generally, embodiments of the present disclosure may use various protocols, such as a SSL or TLS protocol and extensions thereto, such as defined in Request for Comments (RFC) 2246, RFC 2595, RFC 2712, RFC 2817, RFC 2818, RFC 3207, RFC 3268, RFC 3546, RFC 3749, RFC 3943, RFC 4132, RFC 4162, RFC 4217, RFC 4279, RFC 4347, RFC 4366, RFC 4492, RFC 4680, RFC 4681, RFC 4785, RFC 5054, RFC 5077, RFC 5081, RFC 5238, RFC 5246, RFC 5288, RFC 5289, RFC 5746, RFC 5764, RFC 5878, RFC 5932, RFC 6083, RFC 6066, RFC 6091, RFC 6176, RFC 6209, RFC 6347, RFC 6367, RFC 6460, RFC 6655, RFC 7027, and RFC 7366, which are incorporated herein by reference, to establish an encrypted communications session.

Following the establishment of an encrypted communications session, a system performing the process 700 may generate an API request to a key management system to obtain a data key 706. Examples of high level API requests can be found in the description of FIG. 1. A system may submit appropriately configured API requests to a key management system through one or more web service interfaces. In some examples, the API request may be configured as the following example, high-level request: GenerateDataKey(KeyID), in which the KeyID may refer to a specific cryptographic key that a key management system may utilize to encrypt a data key. The API request may then be provided to a key management system 708 through one or more web service interfaces. Upon receipt of the request, a key management system may authenticate the request, and if authentic, provide a response that may include a data key encrypted under a key specified by the KeyID, as well as the corresponding plaintext data key. The response to the API request may then be received 710 by a system through one or more web service interfaces.

Upon receipt of the API request, a system performing the process 700 may determine a message ID 712 as well as obtain a customer secret 714. In some embodiments, a message ID is used to identify specific messages and/or data objects that are being encrypted. A message II) may also be used to obviate the need for multiple data keys. In some examples, the message ID may be of the format of a hash value, a random number, a sequence number that is update, a uniform resource identifier (URI), and/or variations thereof. The customer secret may be a cryptographic key, passphrase, or other supplemental secret present on a system. In some examples, the customer secret may only be present on a customer system, such as the customer system 106, and may be inaccessible to a key management system. In an embodiment, regardless of the location of the customer secret, a key management system cannot access the customer secret in any capacity. Further information regarding the message ID and customer secret can be found in the description of FIG. 2. In an embodiment, a system performing the process 700 obtains 714 the customer secret by looking the customer secret up in a database, prompting a user to enter a customer secret into a field of a graphical user interface or otherwise solicit the customer secret from a user through an interface, generating a new customer secret, or otherwise determining the customer secret.

The message ID, customer secret, as well as the received data key may be utilized by a system performing the process 700 to generate a message encryption key 716. In some examples, the generation of a message encryption key may be the result of a derivation from a key derivation function, which may utilize the message ID, customer secret, and data key as inputs. Further information regarding the generation of a message encryption key can be found in the descriptions of FIG. 2 and FIG. 3. Following the generation of a message encryption key, a system may utilize the message encryption key to encrypt data 718, such as the data obtained 702. In some examples, encryption may also include one or more of the following cryptographic processes: encryption, digital signatures, or otherwise generating data that provides secrecy and/or integrity of the data. The encryption of the data may also be done using a cryptographic cipher that uses the message encryption key as input. Additionally, the message encryption key may be symmetric key of a private key cryptosystem, also known as symmetric key algorithms. Examples of cryptographic ciphers and symmetric key algorithms can be found in the description of FIG. 1

The encrypted data may then be utilized by a system performing the process 700 to generate a data object 720, such as a data object comprising information and/or being structured as discussed above. The data object may comprise the encrypted data, as well as various other components that may denote several characteristics of the data and its encryption. The data object may contain two main sections, a header and a body, in which the header may contain information about the body, and the body may contain the encrypted data. For instance, the system performing the process 700 may generate 720 the data object such that the header of the data object comprises information usable to determine the customer secret, such as described above. Further information of the data object can be found in greater detail in the descriptions of FIG. 5 and FIG. 6.

Following the generation of the data object 720, a system performing the process 700 may generate an API request to a data storage system to store the data object 722. Examples of high level API requests can be found in the description of FIG. 1. A system may submit appropriately configured API requests to a data storage system through one or more web service interfaces. In some examples, the API request may be configured as the following example, high-level request: Put(ObjectID, DestinationID), in which the ObjectID may specify a location of a data object to be stored, and DestinationID may specify a location to store the data object specified by the ObjectID. The API request may then be provided to a data storage system 724 through one or more web service interfaces. The API request may utilize an encrypted communications sessions, as described in the preceding paragraphs. Upon receipt of the request, a data storage system may authenticate the request, and if authentic, may store the data object specified by the ObjectID in the location specified by DestinationID.

Numerous techniques described in connection with FIG. 7 may be performed in different ways and by different systems in accordance with various embodiments. For instance, in one example, a customer secret is provided to a data storage service through an API request to the data storage service. For instance, a customer system may transmit (e.g., over a US or other cryptographically protected communications session) an API request to store data. The API request may include a parameter that comprises a customer secret. The data storage service may obtain a data key from a key management system and use the customer secret to derive a message encryption key to encrypt the data, such as described above. The data storage service may then store the encrypted data and destroy (e.g., delete, such as by overwriting memory locations storing the customer secret) the customer secret such that, once the customer secret is destroyed by the data storage service, the data storage service lacks access to the customer secret and, therefore, is unable to decrypt the data unless again provided the customer secret (e.g., in a parameter in an API request to retrieve data). The data storage system may similarly delete the data key once encryption is completed to render access to the plaintext data (even with access to the customer secret) unavailable.

As another example, to obtain the message encryption key (or another secret usable to derive the message encryption key), the customer may provide the customer secret to the key management system, such as in a parameter in an API request (e.g., transmitted over a cryptographically protected communications session) to the key management system to obtain a data key (in this case a message encryption key). A message ID or other such information (e.g., context and/or a label) may also be provided. The key management system may use the customer secret to derive a message encryption key or other secret and provide the message encryption key (along with an encrypted data key (DK), encrypted under a managed key (MK), such as described above) in a response to the API request. The key management system may delete the customer secret after use, such as described above. The customer system may then use the provided message encryption key (or a secret derived from it) to encrypt data, such as described above. In yet another example, such operations are performed by a data storage service.

Figure 8:
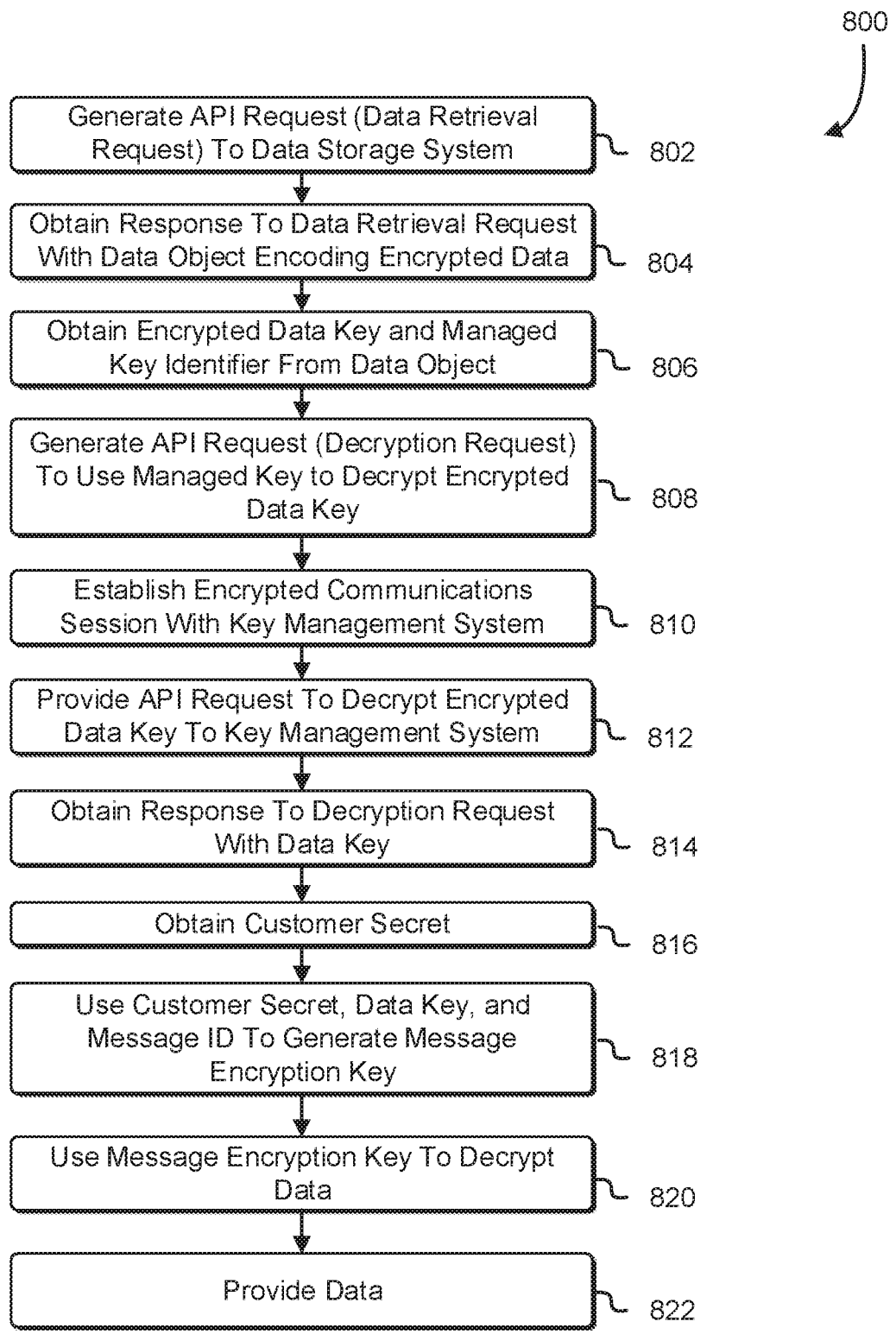
FIG. 8 shows a diagram illustrating a process for a system to obtain and decrypt a data object that comprises encrypted data.

FIG. 8 illustrates an example of a process 800 that may be performed obtain and decrypt a data object comprising encrypted data in accordance with various embodiments. The process 800 may be performed by any suitable system, such as the suitable system performing process 700. In an embodiment, the process 800 includes generating an API request, specifically a data retrieval request, to a data storage system 802. Examples of high level API requests can be found in the description of FIG. 1. A system may submit appropriately configured API requests to a key management system through one or more web service interfaces. In some examples, the API request may be configured as the following example, high-level request: Get(ObjectID, DestinationID), in which the ObjectID may specify a specific data object, which may be a data object containing encrypted data, and DestinationID may specify a specific location in which the data object identified by ObjectID may be stored.

The API request may then be provided by a system performing the process 800 to a data storage system through one or more web service interfaces. Upon receipt of the request, a data storage system may authenticate the request, and if authentic, provide a response containing a data object that comprises encrypted data, as well as one or more additional components, such as encrypted cryptographic keys, which may be received by the system that submitted the request 804. Upon receipt of the response, a system performing the process 800 may obtain an encrypted data key and corresponding managed key identifier from data object 806 contained within the response. Further information regarding the format of the data object comprising encrypted data can be found in the descriptions of FIG. 5 and FIG. 6.

The encrypted data key and corresponding managed key identifier obtained may have originated from a key management system, in which a system performing the process 800 may generate a decryption API request to a key management system to decrypt the data key 808. Examples of high level API requests can be found in the description of FIG. 1. In some examples, the API request may be configured as the following example, high-level request: Decrypt(KeyID, Ciphertext, [AAD]), in which the KeyID may specify the key identified by a managed key identifier to decrypt the encrypted data key, Ciphertext may specify the ciphertext of the encrypted data key, and [AAD], or additional authenticated data, may provide additional authentication data required for the processing of the request. An encrypted communications session may be established with a key management system 810 to facilitate a secure communications channel. Further information regarding an encrypted communications session may be found in the description of FIG. 7. The API request may then be provided to a key management system 812 through one or more web service interfaces.

Upon receipt of the request, a key management system may authenticate the request, and if authentic, provide a response that may include a decrypted data key. A system performing the process 800 may obtain the decrypted data key 814, and additionally may also obtain a customer secret 816, such as described above in connection with FIG. 7. In one example, a system performing the process 800 uses information in a header of the data object to determine the customer secret, such as by using an identifier in the header to lookup the customer secret, using information in the header to derive the customer secret (e.g., in combination with yet another secret), and/or by prompting a user to input the customer secret into an interface. The customer secret may be a cryptographic key, passphrase, or other supplemental secret present on a system performing the process 800. In some examples, the customer secret may only be present on a customer system, such as the customer system 106, and may be inaccessible to a key management system. In an embodiment, regardless of the location of the customer secret, a key management system cannot access the customer secret in any capacity. Additionally, a message ID may also be obtained; in some embodiments, a message ID is used to identify specific messages and/or data objects that are being encrypted. A message II) may also be used to obviate the need for multiple data keys. In some examples, the message ID may be of the format of a hash value, a random number, a sequence number that is update, a uniform resource identifier (URI), and/or variations thereof. Further information regarding the message ID and customer secret can be found in the description of FIG. 2. In some embodiments, a customer system stores (e.g., in a database) customer secrets in association with message IDs to enable the message ID to be usable to lookup the customer secret.

The message ID, customer secret, as well as the received decrypted data key may be utilized by a system performing the process 800 to generate a message encryption key 818. In some examples, the generation of a message encryption key may be the result of a derivation from a key derivation function, which may utilize the message ID, customer secret, and data key as inputs. Further information regarding the generation of a message encryption key can be found in the descriptions of FIG. 2 and Following the generation of a message encryption key, a system performing the process 800 may utilize the message encryption key to decrypt the encrypted data 820 contained within the data object obtained 806. The decryption of the data may be done using a cryptographic cipher that uses the message encryption key as input. Additionally, the message encryption key may be symmetric key of a private key cryptosystem, also known as symmetric key algorithms. Examples of both cryptographic ciphers and symmetric key algorithms can be found in the description of FIG. 1. Following the decryption of the data, the decrypted data may then be provided 822 to a suitable system for further use. As with all processes described herein, variations are considered as being within the scope of the present disclosure. For example, process 800 and process 700 may include additional operations not illustrated in FIG. 8 and FIG. 7, respectively; additionally, one or more of the operations performed in process 800 and process 700 may be performed in various orders and combinations, including in parallel.

Numerous other variations are also considered as being within the scope of the present disclosure. For example, as noted above, a customer computer system may perform various processes described herein in accordance with executable instructions encoded on a computer-readable storage medium. The instructions may be provided to the customer computer system from a service provider, such as part of a client library of executable code programming modules provided by the service provider. The service provider may make such code accessible over the Internet or another network. In addition, various embodiments are illustrated herein using two different entities with access to different keys, although the scope of the present disclosure is not limited to such embodiments and numbers of involved identities. For example, the techniques illustrated and described herein are extendible to involve additional entities with access to keys. Generally, data may be encrypted using multiple keys from different entities. A customer computer system may be configured to orchestrate the actions (e.g., encryption/decryption) of the various entities for the purpose of encrypting data so that involvement of all entities is required and for the purpose of decrypting data encrypted in such a manner.

In addition, various techniques described above involve various communications with one or more service providers that can be orchestrated by a client computer system (e.g., computer system of a customer, described above). Code for causing a client computer system to utilize one or more techniques may be integrated into a software development kit (SDK) used to create applications for the client computer system. Also, in some embodiments, a client computer system may be programmed to utilize one or more of the techniques described above in connection with various triggers. In one example, an application may provide a file system interface (e.g., a file system driver interface) or a storage device interface (e.g., for a virtual storage device that utilizes a data storage service). The various techniques described above may, as appropriate, be utilized in response to receipt of various commands through the interface. For instance, interaction with the interface indicating a command to store data in a file system or storage device may cause encryption to happen in accordance with one or more of the embodiments described above. Similarly, interaction with the interface indicating a command to retrieve data from the file system or storage device may cause utilization of one or more techniques described above for decrypting data. Such techniques may also be applied to other interfaces.

As another example of a variation considered being within the scope of the present disclosure, integration of the various techniques described herein may be utilized in a manner that allows for backward compatibility. An application utilizing the various techniques may, for instance, read a configuration to determine how to interact with a service provider and which key's to use (i.e., which keys use itself and which keys to specify to the service provider). In this manner, if techniques encoded in an SDK change over time, data encrypted and stored using previously utilized techniques may nevertheless remain accessible. The SDK may contain programming logic that enables selection of which techniques to use (if any), which keys to use and the like. To determine which techniques to use (if any) and/or which keys to use, the programming logic in the SDK may utilize information about a local configuration set for the client computer system, information provided from a service provider computer system and/or in other ways.

As discussed above in connection with FIG. 7, numerous variations to techniques described in connection with FIG. 8 are considered as being within the scope of the present disclosure. For instance, as discussed, one such variation involves the customer providing the customer secret to a data storage service to enable the data storage service to perform key derivation, encryption, and other cryptographic operations using a key generated from the customer secret and a data key. For instance, in an embodiment, a customer system transmits (e.g., over a MS or other cryptographically protected communications session) an API request to retrieve data. The API request may include a parameter that comprises a customer secret. The data storage service may obtain a data key from a key management system and use the customer secret to derive a message encryption key to encrypt the data, such as described above. The data storage service may then, after retrieving encrypted data from storage, decrypt the encrypted data and then destroy (e.g., delete, such as by overwriting memory locations storing the customer secret) the customer secret such that, once the customer secret is destroyed by the data storage service, the data storage service lacks access to the customer secret and, therefore, is unable to decrypt the data again unless again provided the customer secret (e.g., in a parameter in another API request to retrieve data). The data storage system may similarly delete the data key once decryption is completed to render access to the plaintext data (even with access to the customer secret) unavailable. The data storage system, upon decrypting the encrypted data, may provide the decrypted data to the customer system in response to the request.

As noted above, some variations involve a customer system (or a data storage service) providing the customer secret to the key management system in a parameter to an API request. Similarly, to decrypt data, such a system may transmit a decrypt API request (e.g., over a cryptographically protected communications session) to the key management system to decrypt a data key that is encrypted under a managed key and to provide a message encryption key. Such a request may include an identifier of the managed key, such as noted above and additional data, such as context and a label, if applicable. Similarly, to enable the key management system to derive the message encryption key, the API request may include the customer secret so that the key management system can use the identified managed key to decrypt the data key, then use the data key and the customer secret to derive the message encryption key and provide the derived message encryption key in response to the API request to enable the customer system (or data storage system) to decrypt data encrypted under the message encryption key.

Figure 9:
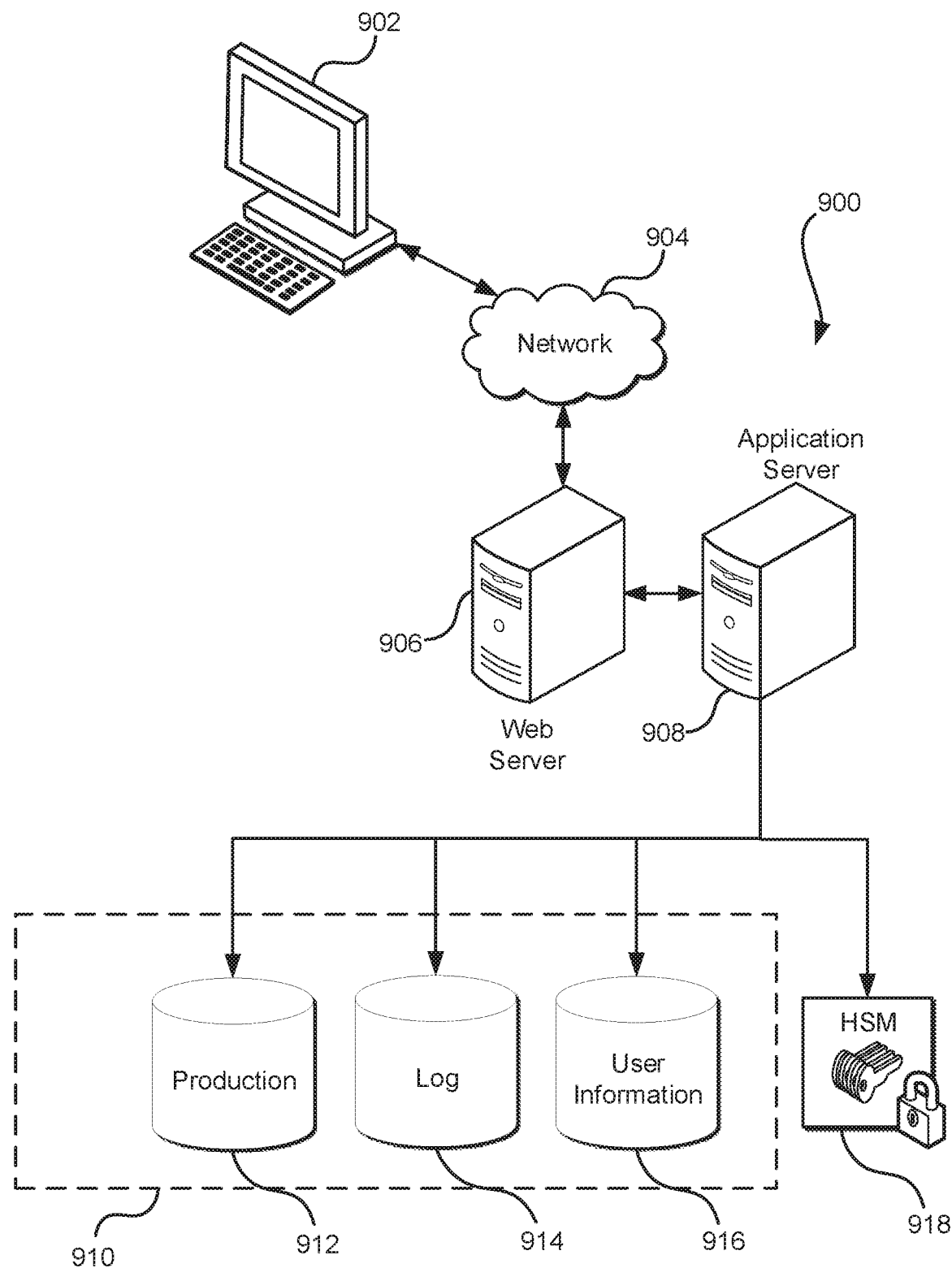
FIG. 9 illustrates a system in which various embodiments can be implemented.

FIG. 9 illustrates aspects of an example system 900 for implementing aspects in accordance with an embodiment. As will be appreciated, although a web-based system is used for purposes of explanation, different systems may be used, as appropriate, to implement various embodiments. In an embodiment, the system includes an electronic client device 902, which includes any appropriate device operable to send and/or receive requests, messages, or information over an appropriate network 904 and convey information back to a user of the device. Examples of such client devices include personal computers, cellular or other mobile phones, hand-held messaging devices, laptop computers, tablet computers, set-top boxes, personal data assistants, embedded computer systems, electronic book readers, and the like. In an embodiment, the network includes any appropriate network, including an intranet, the Internet, a cellular network, a local area network, a satellite network or any other such network and/or combination thereof, and components used for such a system depend at least in part upon the type of network and/or system selected. Many protocols and components for communicating via such a network are well known and will not be discussed herein in detail. In an embodiment, communication over the network is enabled by wired and/or wireless connections and combinations thereof. In an embodiment, the network includes the Internet and/or other publicly addressable communications network, as the system includes a web server 906 for receiving requests and serving content in response thereto, although for other networks an alternative device serving a similar purpose could be used as would be apparent to one of ordinary skill in the art.

In an embodiment, the illustrative system includes at least one application server 908 and a data store 910, and it should be understood that there can be several application servers, layers or other elements, processes or components, which may be chained or otherwise configured, which can interact to perform tasks such as obtaining data from an appropriate data store. Servers, in an embodiment, are implemented as hardware devices, virtual computer systems, programming modules being executed on a computer system, and/or other devices configured with hardware and/or software to receive and respond to communications (e.g., web service application programming interface (API) requests) over a network. As used herein, unless otherwise stated or clear from context, the term "data store" refers to any device or combination of devices capable of storing, accessing and retrieving data, which may include any combination and number of data servers, databases, data storage devices and data storage media, in any standard, distributed, virtual or clustered system. Data stores, in an embodiment, communicate with block-level and/or object-level interfaces. The application server can include any appropriate hardware, software and firmware for integrating with the data store as needed to execute aspects of one or more applications for the client device, handling some or all of the data access and business logic for an application.

In an embodiment, the application server provides access control services in cooperation with the data store and generates content including but not limited to text, graphics, audio, video and/or other content that is provided to a user associated with the client device by the web server in the form of HyperText Markup Language ("HTML"), Extensible Markup Language ("XML"), JavaScript, Cascading Style Sheets ("CSS"), JavaScript Object Notation (JSON), and/or another appropriate client-side or other structured language. Content transferred to a client device, in an embodiment, is processed by the client device to provide the content in one or more forms including but not limited to forms that are perceptible to the user audibly, visually and/or through other senses. The handling of all requests and responses, as well as the delivery of content between the client device 902 and the application server 908, in an embodiment, is handled by the web server using PHP: Hypertext Preprocessor ("PHP"), Python, Ruby, Perl, Java, HTML, XML, JSON, and/or another appropriate server-side structured language in this example. In an embodiment, operations described herein as being performed by a single device are performed collectively by multiple devices that form a distributed and/or virtual system.

The data store 910, in an embodiment, includes several separate data tables, databases, data documents, dynamic data storage schemes and/or other data storage mechanisms and media for storing data relating to a particular aspect of the present disclosure. In an embodiment, the data store illustrated includes mechanisms for storing production data 912 and user information 916, which are used to serve content for the production side. The data store also is shown to include a mechanism for storing log data 914, which is used, in an embodiment, for reporting, computing resource management, analysis or other such purposes. In an embodiment, other aspects such as page image information and access rights information (e.g., access control policies or other encodings of permissions) are stored in the data store in any of the above listed mechanisms as appropriate or in additional mechanisms in the data store 910.

The data store 910, in an embodiment, is operable, through logic associated therewith, to receive instructions from the application server 908 and obtain, update or otherwise process data in response thereto, and the application server 908 provides static, dynamic, or a combination of static and dynamic data in response to the received instructions. In an embodiment, dynamic data, such as data used in web logs (blocs), shopping applications, news services, and other such applications, are generated by server-side structured languages as described herein or are provided by a content management system ("CMS") operating on or under the control of the application server. In an embodiment, a user, through a device operated by the user, submits a search request for a certain type of item. In this example, the data store accesses the user information to verify the identity of the user, accesses the catalog detail information to obtain information about items of that type, and returns the information to the user, such as in a results listing on a web page that the user views via a browser on the user device 902. Continuing with example, information for a particular item of interest is viewed in a dedicated page or window of the browser. It should be noted, however, that embodiments of the present disclosure are not necessarily limited to the context of web pages but are more generally, applicable to processing requests in general, where the requests are not necessarily requests for content. Example requests include requests to manage and/or interact with computing resources hosted by the system 900 and/or another system, such as for launching, terminating, deleting, modifying, reading, and/or otherwise accessing such computing resources.

In an embodiment, the data store system 900 comprises one or more cryptographic devices, such as hardware security modules 918 or other devices that provide hardware protection of cryptographic secrets, such as managed keys and other secrets. For instance, as noted above, to fulfill a request, the system 900 (e.g., the application server 908) may load an encrypted version of a managed key into an HSM 918 and command or otherwise instruct the HSM 918 to decrypt the managed key using a key held securely in the HSM and then use the managed key to perform an operation, such as encrypting or decrypting a data key, such as described above.

In an embodiment, each server typically includes an operating system that provides executable program instructions for the general administration and operation of that server and includes a computer-readable storage medium (e.g., a hard disk, random access memory, read only memory, etc.) storing instructions that, if executed by a processor of the server, cause or otherwise allow the server to perform its intended functions (e.g., the functions are performed as a result of one or more processors of the server executing instructions stored on a computer-readable storage medium).

The system 900, in an embodiment, is a distributed and/or virtual computing system utilizing several computer systems and components that are interconnected via communication links (e.g., transmission control protocol (TCP) connections and/or transport layer security (TLS) or other cryptographically protected communication sessions using one or more computer networks or direct connections. However, it will be appreciated by those of ordinary skill in the art that such a system could operate in a system having fewer or a greater number of components than are illustrated in FIG. 9. Thus, the depiction of the system 900 in FIG. 9 should be taken as being illustrative in nature and not limiting to the scope of the disclosure.

The various embodiments further can be implemented in a wide variety of operating environments, which in some cases can include one or more user computers, computing devices or processing devices which can be used to operate any of a number of applications. In an embodiment, user or client devices include any of a number of computers, such as desktop, laptop or tablet computers running a standard operating system, as well as cellular (mobile), wireless and handheld devices running mobile software and capable of supporting a number of networking and messaging protocols, and such a system also includes a number of workstations running any of a variety of commercially available operating systems and other known applications for purposes such as development and database management. In an embodiment, these devices also include other electronic devices, such as dummy terminals, thin-clients, gaming systems and other devices capable of communicating via a network, and virtual devices such as virtual machines, hypervisors, software containers utilizing operating-system level virtualization and other virtual devices or non-virtual devices supporting virtualization capable of communicating via a network.

In an embodiment, a system utilizes at least one network that would be familiar to those skilled in the art for supporting communications using any of a variety of commercially available protocols, such as Transmission Control Protocol/Internet Protocol ("TCP/IP"), User Datagram Protocol ("UDP"), protocols operating in various layers of the Open System Interconnection ("OSI") model, File Transfer Protocol ("FTP"), Universal Plug and Play ("UpnP"), Network File System ("NFS"), Common Internet File System ("CIFS") and other protocols. The network, in an embodiment, is a local area network, a wide-area network, a virtual private network, the Internet, an intranet, an extranet, a public switched telephone network, an infrared network, a wireless network, a satellite network, and any combination thereof. In an embodiment, a connection-oriented protocol is used to communicate between network endpoints such that the connection-oriented protocol (sometimes called a connection-based protocol) is capable of transmitting data in an ordered stream, in an embodiment, a connection-oriented protocol can be reliable or unreliable. For example, the TCP protocol is a reliable connection-oriented protocol. Asynchronous Transfer Mode ("ATM") and Frame Relay are unreliable connection-oriented protocols. Connection-oriented protocols are in contrast to packet-oriented protocols such as UDP that transmit packets without a guaranteed ordering.

In an embodiment, the system utilizes a web server that runs one or more of a variety of server or mid-tier applications, including Hypertext Transfer Protocol ("HTTP") servers, FTP servers, Common Gateway Interface ("CGI") servers, data servers, Java servers, Apache servers, and business application servers. In an embodiment, the one or more servers are also capable of executing programs or scripts in response to requests from user devices, such as by executing one or more web applications that are implemented as one or more scripts or programs written in any programming language, such as Java®, C, C# or C++, or any scripting language, such as Ruby, PHP, Perk Python or TCL, as well as combinations thereof. In an embodiment, the one or more servers also include database servers, including without limitation those commercially available from Oracle®, Microsoft®, Sybase®, and IBM® as well as open-source servers such as MySQL, Postgres, SQLite, MongoDB, and any other server capable of storing, retrieving, and accessing structured or unstructured data. In an embodiment, a database server includes table-based servers, document-based servers, unstructured servers, relational servers, non-relational servers, or combinations of these and/or other database servers.

In an embodiment, the system includes a variety of data stores and other memory and storage media as discussed above which can reside in a variety of locations, such as on a storage medium local to (and/or resident in) one or more of the computers or remote from any or all of the computers across the network. In an embodiment, the information resides in a storage-area network ("SAN") familiar to those skilled in the art and, similarly, any necessary files for performing the functions attributed to the computers, servers or other network devices are stored locally and/or remotely, as appropriate. In an embodiment where a system includes computerized devices, each such device can include hardware elements that are electrically coupled via a bus, the elements including, for example, at least one central processing unit ("CPU" or "processor"), at least one input device (e.g., a mouse, keyboard, controller, touch screen, or keypad), at least one output device (e.g., a display device, printer, or speaker), at least one storage device such as disk drives, optical storage devices, and solid-state storage devices such as random access memory ("RAM") or read-only memory ("ROM"), as well as removable media devices, memory cards, flash cards, etc., and various combinations thereof.

In an embodiment, such a device also includes a computer-readable storage media reader, a communications device (e.g., a modem, a network card (wireless or wired), an infrared communication device, etc.), and working memory as described above where the computer-readable storage media reader is connected with, or configured to receive, a computer-readable storage medium, representing remote, local, fixed, and/or removable storage devices as well as storage media for temporarily and/or more permanently containing, storing, transmitting, and retrieving computer-readable information. In an embodiment, the system and various devices also typically include a number of software applications, modules, services, or other elements located within at least one working memory device, including an operating system and application programs, such as a client application or web browser. In an embodiment, customized hardware is used and/or particular elements are implemented in hardware, software (including portable software, such as applets), or both. In an embodiment, connections to other computing devices such as network input/output devices are employed.

In an embodiment, storage media and computer readable media for containing code, or portions of code, include any appropriate media known or used in the art, including storage media and communication media, such as but not limited to volatile and non-volatile, removable and non-removable media implemented in any method or technology for storage and/or transmission of information such as computer readable instructions, data structures, program modules or other data, including RAM, ROM, Electrically Erasable Programmable Read-Only Memory ("EEPROM"), flash memory or other memory technology, Compact Disc Read-Only Memory ("CD-ROM"), digital versatile disk (DVD) or other optical storage, magnetic cassettes, magnetic tape, magnetic disk storage or other magnetic storage devices or any other medium which can be used to store the desired information and which can be accessed by the system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

Other variations are within the spirit of the present disclosure. Thus, while the disclosed techniques are susceptible to various modifications and alternative constructions, certain illustrated embodiments thereof are shown in the drawings and have been described above in detail, it should be understood, however, that there is no intention to limit the invention to the specific form or forms disclosed but, on the contrary, the intention is to cover all modifications, alternative constructions, and equivalents falling within the spirit and scope of the invention, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. Similarly, use of the term "or" is to be construed to mean "and/or" unless contradicted explicitly or by context. The terms "comprising," "having," "including," and "containing" are to be construed as open-ended terms (i.e., meaning "including, but not limited to,") unless otherwise noted. The term "connected," when unmodified and referring to physical connections, is to be construed as partly or wholly contained within, attached to, or joined together, even if there is something intervening. Recitation of ranges of values herein are merely intended to serve as a shorthand method of referring individually to each separate value falling within the range, unless otherwise indicated herein, and each separate value is incorporated into the specification as if it were individually recited herein. The use of the term "set" (e.g., "a set of items") or "subset" unless otherwise noted or contradicted by context, is to be construed as a nonempty collection comprising one or more members. Further, unless otherwise noted or contradicted by context, the term "subset" of a corresponding set does not necessarily denote a proper subset of the corresponding set, but the subset and the corresponding set may be equal. The use of the phrase "based on," unless otherwise explicitly stated or clear from context, means "based at least in part on" and is not limited to "based solely on."

Conjunctive language, such as phrases of the form "at least one of A, B, and C," or "at least one of A, B and C," the same phrase with or without the Oxford comma) unless specifically stated otherwise or otherwise clearly contradicted by context, is otherwise understood within the context as used in general to present that an item, term, etc., may be either A or B or C, any nonempty subset of the set of A and B and C, or any set not contradicted by context or otherwise excluded that contains at least one A, at least one B, or at least one C. For instance, in the illustrative example of a set having three members, the conjunctive phrases "at least one of A, B, and C" and "at least one of A, B and C" refer to any of the following sets: {A}, {B}, {C}, {A, B}, {A, C}, {B, C}, {A, B, C}, and, if not contradicted explicitly or by context, any set having {A}, {B}, and/or {C} as a subset (e.g., sets with multiple "A"). Thus, such conjunctive language is not generally intended to imply that certain embodiments require at least one of A, at least one of B and at least one of C each to be present. Similarly, phrases such as "at least one of A, B, or C" and "at least one of A, B or C" refer to the same as "at least one of A, B, and C" and "at least one of A, B and C" refer to any of the following sets: {A}, {B}, {C}, {A, B}, {A, C}, {B, C}, {A, B, C}, unless differing meaning is explicitly stated or clear from context. In addition, unless otherwise noted or contradicted by context, the term "plurality" indicates a state of being plural (e.g., "a plurality of items" indicates multiple items). The number of items in a plurality is at least two but can be more when so indicated either explicitly or by context.

Operations of processes described herein can be performed in any suitable order unless otherwise indicated herein or otherwise clearly contradicted by context. In an embodiment, a process such as those processes described herein (or variations and/or combinations thereof) is performed under the control of one or more computer systems configured with executable instructions and is implemented as code (e.g., executable instructions, one or more computer programs or one or more applications) executing collectively on one or more processors, by hardware or combinations thereof. In an embodiment, the code is stored on a computer-readable storage medium, for example, in the form of a computer program comprising a plurality of instructions executable by one or more processors. In an embodiment, a computer-readable storage medium is a non-transitory computer-readable storage medium that excludes transitory signals (e.g., a propagating transient electric or electromagnetic transmission) but includes non-transitory data storage circuitry (e.g., buffers, cache, and queues) within transceivers of transitory signals. In an embodiment, code (e.g., executable code or source code) is stored on a set of one or more non-transitory computer-readable storage media having stored thereon executable instructions that, when executed (i.e., as a result of being executed) by one or more processors of a computer system, cause the computer system to perform operations described herein. The set of non-transitory computer-readable storage media, in an embodiment, comprises multiple non-transitory computer-readable storage media, and one or more of individual non-transitory storage media of the multiple non-transitory computer-readable storage media lack all of the code while the multiple non-transitory computer-readable storage media collectively store all of the code. In an embodiment, the executable instructions are executed such that different instructions are executed by different processors for example, in an embodiment, a non-transitory computer-readable storage medium stores instructions and a main CPU executes some of the instructions while a graphics processor unit executes other instructions. In another embodiment, different components of a computer system have separate processors and different processors execute different subsets of the instructions.

Accordingly, in an embodiment, computer systems are configured to implement one or more services that singly or collectively perform operations of processes described herein, and such computer systems are configured with applicable hardware and/or software that enable the performance of the operations. Further, a computer system, in an embodiment of the present disclosure, is a single device and, in another embodiment, is a distributed computer system comprising multiple devices that operate differently such that the distributed computer system performs the operations described herein and such that a single device does not perform all operations.

The use of any and all examples or exemplary language (e.g., "such as") provided herein is intended merely to better illuminate embodiments of the invention and does not pose a limitation on the scope of the invention unless otherwise claimed. No language in the specification should be construed as indicating any non-claimed element as essential to the practice of the invention.

Embodiments of this disclosure are described herein, including the best mode known to the inventors for carrying out the invention. Variations of those embodiments may become apparent to those of ordinary skill in the art upon reading the foregoing description. The inventors expect skilled artisans to employ such variations as appropriate, and the inventors intend for embodiments of the present disclosure to be practiced otherwise than as specifically described herein. Accordingly, the scope of the present disclosure includes all modifications and equivalents of the subject matter recited in the claims appended hereto as permitted by applicable law. Moreover, any combination of the above-described elements in all possible variations thereof is encompassed by the scope of the present disclosure unless otherwise indicated herein or otherwise clearly contradicted by context.

All references including publications, patent applications, and patents cited herein are hereby incorporated by reference to the same extent as if each reference were individually and specifically indicated to be incorporated by reference and were set forth in its entirety herein.

What is claimed is:

1. A system, comprising:
one or more processors; and
memory storing instructions executable by the one or more processors to cause the system to:
transmit an application programming interface request to a key management service to obtain a data key, the application programming interface request indicating an identifier of a managed key to be used by the key management service to fulfill the application programming interface request;
obtain a response to the application programming interface request that comprises the data key in plaintext form and the data key encrypted under the managed key;
use the data key, a secret, and a key derivation function to generate a message encryption key, the secret being inaccessible to the key management service;
use the message encryption key to encrypt data to result in encrypted data;
generate a data object that comprises the encrypted data and a header, the header comprising the data key encrypted under the managed key and information usable to determine the secret; and
store the data object.

2. The system of claim 1, wherein the data key and the message encryption key are symmetric cryptographic keys.

3. The system of claim 1, wherein the instructions that cause the system to use the data key, the secret, and the key derivation function to generate the message encryption key are executable by the one or more processors to:
determine a message identifier specific to the data;
generate a message specific data key based on the message identifier and the data key; and
use the message specific data key and the secret to generate the message encryption key.

4. The system of claim 1, wherein:
the instructions are further executable by the one or more processors to cause the system to establish an encrypted communications session with the key management service; and
the application programming interface request and the response to the application programming interface request are transmitted over the encrypted communications session.

5. A computer-implemented method, comprising:
obtaining an encrypted first data key from a key management system in response to an application programming interface request to the key management system;
obtaining a cryptographic protection key based on the first data key, a second data key unavailable to the key management system, and a key derivation function;
using the cryptographic protection key to cryptographically protect data by at least encrypting the data, thereby resulting in encrypted data; and
providing the encrypted data with a header that comprises: (a) the first data key encrypted to be decryptable by another key managed by the key management system and (b) information to determine the second data key.

6. The computer-implemented method of claim 5, wherein obtaining the encrypted first data key comprises:
transmitting the application programming interface request to the key management system over a network; and
receiving a response to the application programming interface request that includes the encrypted first data key.

7. The computer-implemented method of claim 6, wherein the response to the application programming interface request comprises a plaintext version of the first data key.

8. The computer-implemented method of claim 7, wherein the plaintext version of the first data key is obtained from the key management system over a cryptographically protected communications session.

9. The computer-implemented method of claim 5, wherein:
the header information to determine the second data key comprises an indicator of the second data key; and
providing the cryptographically protected data includes transmitting the data object to a storage system.

10. The computer-implemented method of claim 5, wherein obtaining the cryptographic protection key comprises inputting the first data key and the second data key into the key derivation function to generate the cryptographic protection key.

11. The computer-implemented method of claim 5, wherein the key management system is a key management service accessible via a network and the application programming interface request is a web-service request.

12. The computer-implemented method of claim 5, wherein using the cryptographic protection key to cryptographically protect the data comprises digitally signing the data.

13. The computer-implemented method of claim 5, further comprising locally generating the first data key.

14. A non-transitory computer-readable storage medium storing thereon instructions that are executable by one or more processors to cause a computer system to:
communicate with a key management system to obtain, in response to an application programming interface request, an encrypted first data key, the encrypted first data key being a first data key encrypted by a managed key that is inaccessible to the computer system;
obtain an encryption key that was generated based on the first data key, a second data key that is inaccessible to the key management system, and a key derivation function;
use the encryption key to encrypt data, resulting in encrypted data, such that the first data key and the second data key are individually insufficient to decrypt the encrypted data; and
provide a data object that comprises the encrypted data and a header with information to determine the second data key and with the encrypted first data key.

15. The non-transitory computer-readable storage medium of claim 14, wherein the instructions cause the computer system to communicate to the key management system by indicating the managed key to the key management system to cause the key management system to select the managed key from a plurality of keys managed by the key management system.

16. The non-transitory computer-readable storage medium of claim 14, wherein the instructions that cause the computer system to obtain the encryption key cause the computer system to use a key derivation function to derive the encryption key based on the first data key and the second data key.

17. The non-transitory computer-readable storage medium of claim 14, wherein the instructions further cause the computer system to locally generate the second data key.

18. The non-transitory computer-readable storage medium of claim 14, wherein the instructions further comprise instructions executable by the one or more processors to cause the computer system to store the encrypted data in association with the encrypted first data key and the second data key.

19. The non-transitory computer-readable storage medium of claim 18, wherein the instructions that cause the computer system to store the encrypted data in association with the encrypted first data key and the second data key cause the computer system to generate a data object that comprises the encrypted data and the encrypted first data key.

20. The non-transitory computer-readable storage medium of claim 19, wherein the data object further comprises an identifier of the managed key.

21. A system, comprising:
one or more processors; and
memory storing instructions executable by the one or more processors to cause the system to:
  communicate with a key management system to obtain, in response to an application programming interface request, an encrypted first data key, the encrypted first data key being a first data key encrypted by a managed key that is inaccessible to the system;
  obtain an encryption key that was generated based on the first data key, a second data key that is inaccessible to the key management system, and a key derivation function;
  use the encryption key to encrypt data, resulting in encrypted data, such that the first data key and the second data key are individually insufficient to decrypt the encrypted data; and
  provide a data object that comprises the encrypted data and a header with the encrypted first data key and with information to determine the second data key.

22. The system of claim 21, wherein the key management system lacks access to the first data key until obtaining a response to the application programming interface request.

23. The system of claim 21, wherein the instructions are further executable to cause the system to delete the first data key to prevent the system from having access to the first data key after deriving the encryption key.

24. The system of claim 21, wherein the instructions are further executable to cause the system to submit, to the key management system, another application programming interface request to cause the key management system to decrypt the encrypted first data key and provide the first data key to enable the system to decrypt the encrypted data.

* * * * *